April 20, 1971 W. F. ALLPORT 3,575,777

INTEGRATED PAPER NETTING

Filed Oct. 4, 1968 17 Sheets-Sheet 1

April 20, 1971 W. F. ALLPORT 3,575,777

INTEGRATED PAPER NETTING

Filed Oct. 4, 1968 17 Sheets-Sheet 8

INTEGRATED PAPER NETTING

United States Patent Office 3,575,777

Patented Apr. 20, 1971

3,575,777

INTEGRATED PAPER NETTING

Walter F. Allport, Stamford, Conn., assignor to International Paper Company, New York, N.Y.

Continuation-in-part of application Ser. No. 600,899, Dec. 12, 1966. This application Oct. 4, 1968, Ser. No. 777,944

Int. Cl. B32b 3/00, 5/12

U.S. Cl. 161—57 5 Claims

ABSTRACT OF THE DISCLOSURE

An integrated netting made from sets of paper or plastic warp and weft strands adhered together between the intersections of the warp and weft strands to form a tough, flexible tear-resistant netting. The netting may be rendered moisture or vapor-proof through the additional lamination of paper or plastic sheet material. Processes and equipment for forming multiple strands and various combinations of warp and weft strands so as to vary the characteristics and properties of the netting are shown.

This application is a continuation-in-part of copending application Ser. No. 600,899 filed Dec. 12, 1966, now abandoned.

This invention relates to novel integrated netting and processes and apparatus for preparing such netting. More particularly, the invention relates to a flexible net of paper or plastic strands, a laminate of such a net with sheet material and processes and apparatus for preparing such products.

It has long been known that paper has a high tensile strength, good abrasion resistance, uniformity, printability and cleanliness, and low cost. However, paper ordinarily has a very poor resistance to tearing and this has, in the past, limited the use of paper in applications where product toughness is an important consideration.

Paper netting products heretofore manufactured by the ordinary methods of weaving or knitting a paper yarn result in materials with some improvement in toughness. However, knitting and weaving are not well adapted to paper as a raw material. For either knitting or weaving, high cost, high wet strength, low-basis weight paper is required. Such paper is wetted and then twisted, folded or crimped to provide sufficient yarn suppleness for the knitting and weaving operations. However, the weaving and knitting processes are slow since both processes require several separate steps to transform rolls of paper into a paper netting. These steps normally include slitting wide rolls of paper and rewinding into cheeses (thin rolls of paper); unwinding the cheeses, wetting and twisting the narrow strips into yarn which is wound on bobbins; rewinding the yarn on cones; mounting the cones on the weaving or knitting machinery; and forming the paper fabric. Also, both processes require considerable labor and complex and expensive machinery.

Both knitting and weaving require the combination of suppleness and strength that is found in conventional textile yarns, but paper is normally too stiff for these processes. When paper is wetted to make it more supple its strength is substantially reduced—up to 70% less strength even for wet strength paper. The lack of flexibility in dry paper and lack of strength in wetted paper leads to frequent yarn breakage and machine down time when paper is knitted or woven.

As a result, neither the knitting process nor the weaving process has provided a satisfactory low-cost solution to the problem of forming paper netting, bearing in mind that the cost of the paper netting must be kept low in order to compete favorably with coarse fabrics such as burlap and with reinforcing materials such as fiber glass scrim.

Sheet plastic materials, like paper, also have a poor resistance to tearing and therefore such materials have limited utility for applications requiring toughness.

It is therefore the primary object of the present invention to produce a paper or plastic netting which combines the high tensile strength, good abrasion resistance, printability and cleanliness of paper or plastic while avoiding the low resistance to tearing ordinarily found in these materials.

Another object of the invention is to utilize low-cost high basis weight paper to provide a low-cost paper netting having high strength and toughness.

Still another object of the invention is to provide a paper or plastic netting which can be manufactured at high production rates on a continuous basis.

A still further object of the invention is to provide a paper or plastic netting which is neither knitted nor woven but, taking advantage of the relative ease of bonding paper to paper or plastic to plastic, comprises a netting of intermittently bonded strands of paper or plastic.

A still further object of the present invention is to provide a low-cost paper or plastic netting laminated on one or both sides with a plastic film or paper sheet so as to form a low-cost water-resistant laminate having high strength and toughness characteristics.

A still further object of the invention is to provide a process and equipment for manufacturing paper or plastic netting comprising two or more sets of paper or plastic strands.

A still further object of the invention is to provide a process for manufacturing a laminate of paper or plastic netting comprising two or more sets of paper or plastic strands laminated on one or both sides to plastic or paper sheet material.

These and further objects of the invention are accomplished by a novel arrangement of spaced paper or plastic strands which may be further laminated to paper or plastic material in sheet form. In one form of the invention, the integrated netting made in accordance with the present invention comprises a set of warp strands cut from a roll of low-cost heavy basis weight thermoplastic-coated paper and spaced apart as desired. Subsequently, weft strands of heavy basis weight paper are placed at right angles to the warp strands at spaced locations along the warp strands. A second series of warp strands are then overlaid on the first series of warp strands and the assembly of warp and weft strands passed through a heat and compression stage so as to bond the two sets of warp strands together, except at the intersections between the warp and weft strands. It has often been found desirable to overlay a second series of weft strands over the first series of weft strands prior to passing the assembly of warp and weft strands through the heat and compression stage. In still other circumstances it may be found desirable to use three sets of warp strands with one of the sets of warp strands positioned parallel to the other two sets of overlying warp strands in order to prepare a netting which has smaller interstices.

At the intersections between the warp and weft strands the combined thickness of the strands is such that insufficient heat is transmitted through the strands to effect bonding. The resulting netting comprises intermittently bonded warp strands with sandwiched but unbonded weft strands to form a 3- or 4-ply structure. Due to the unbonded intersections between the warp and weft strands, the structure is relatively flexible and capable of absorbing impact loads without rupture of the strands and therefore the high tensile strength of the paper may be utilized to its fullest extent.

A number of modifications of the basic structure may be provided to meet specific end uses of the integrated netting. For example, the paper strands from which the netting is formed may be cut from stock comprising two or more plies of paper that have been continuously laminated together or are intermittently bonded with thin lines of adhesive running in the cross machine direction of the paper.

In another modification, a relatively fast-setting adhesive may be applied to one or the other of the warp and weft strands so that it is unnecessary to utilize coated paper to form one of the sets of warp or weft strands.

In another modification, the netting comprising one or more sets of warp strands and one or more sets of weft strands may be laminated between sheets of paper or plastic to provide a low-cost sheet material having high strength and toughness characteristics.

In a further modification, one set of warp strands or one set of the weft strands or both may be made wider than the other set of warp or weft strands to provide an integrated netting having a smaller mesh, that is, the interstices between the warp and weft strands are made smaller.

It will also be appreciated that in any of the above modifications, plastic strands may be substituted for the paper strands to produce a plastic netting.

The process for producing the integrated netting according to the present invention, in general, comprises the steps of slitting a first roll of warp strand stock of either single or multiple plies, into a first set of warp strands, separating the warp strands to the desired spacing, shearing or slitting weft strands from a roll of sheet of weft strand stock, positioning the weft strands perpendicular to the warp strands, positioning a second set of spaced warp strands slit from a second roll of warp strand stock so as to overlie the first set of spaced warp strands, passing the assembly of warp and weft strands through a compression stage (with heat added, if desired) to form an integrated netting, and winding the finished netting on a takeup reel. If the final product is desired in sheet form instead of roll form, the finished netting may be sheared into sheets and stacked. If it is desired to laminate a sheet of paper or plastic film to one or both sides of the integrated netting, such material may also be applied to the assembly of warp and weft strands either prior to the compression stage or as a subsequent process step. Of course, if it is desired to provide a second set of weft strands or a third set of warp strands, these are assembled prior to the compression stage.

In the event that it is desired to extrude a thermoplastic material to one or both sides of the netting, the thermoplastic material may be extruded onto the integrated netting in an additional process step using known extrusion equipment.

Intermittent bonding of the warp strands, according to the present invention, may be achieved without the use of an intermittently applied adhesive in the following manner: The netting is passed through a compression stage comprising a heated roller and a resilient backup roller so that uncoated warp strands are adjacent the heated roller while coated warp strands are adjacent the backup roller. When the temperature and speed of the rollers are properly adjusted, sufficient heat is transmitted through the uncoated warp strands to bond the two sets of warp strands throughout their length except in the regions where a weft strand is interposed and, where, due to the lower rate of transfer of the heat, the thermoplastic coating on the warp strands does not become sufficiently soft to achieve a bond. Thus, intermittent bonding is achieved by a continuous process.

As will be explained in detail hereinafter, intermittent bonding between warp and weft strands may also be accomplished by applying spots or lines of adhesive at discrete points along the warp or weft strands. It will be apparent that when this method is utilized it is unnecessary to use plastic-coated stock for one of the sets of warp strands. Furthermore, when this method of operation is employed it is possible to use a standard heated platen press to form the integrated netting from the assembly of warp and weft strands.

The invention will now be described in greater detail with reference to the drawings in which.

Figures 6, 7:
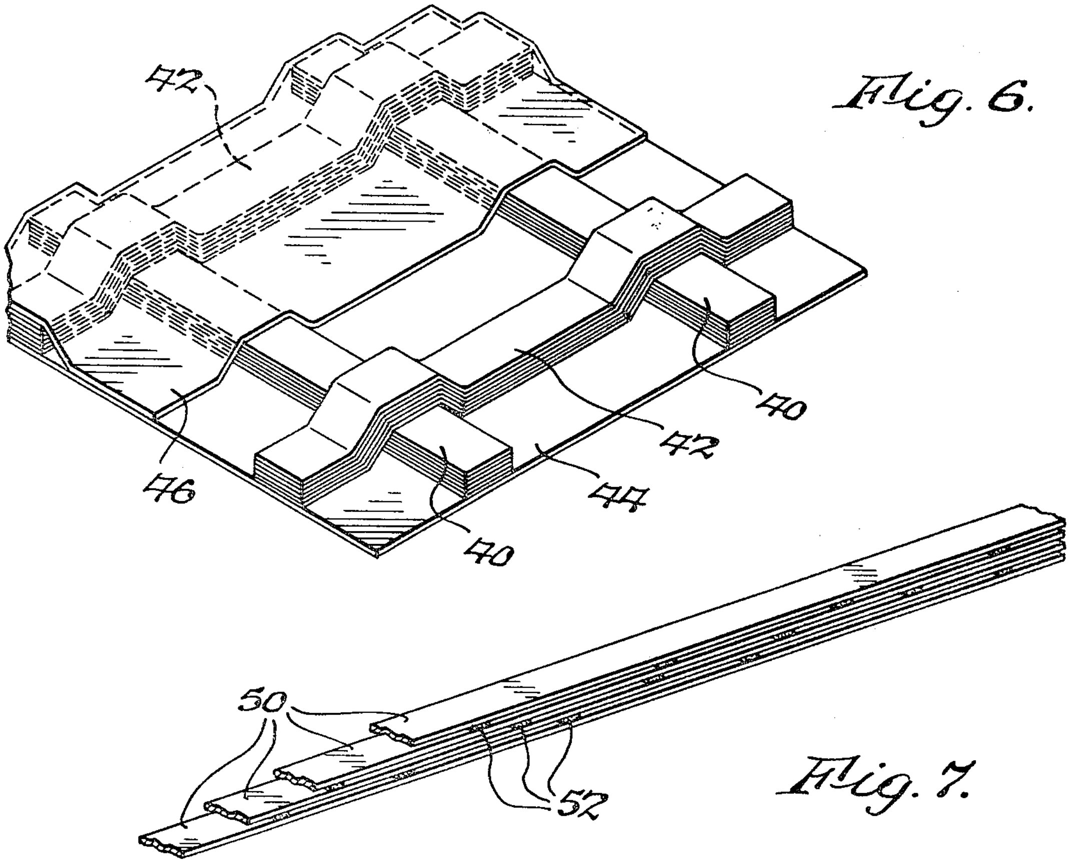

FIG. 6 is an enlarged perspective drawing, partly broken away, of an integrated laminate according to the present invention comprising one set of 6-ply uncoated warp strands, one set of 6-ply uncoated weft strands, a sheet of coated paper on one side of the netting of warp and weft strands and a plastic film on the other side of the netting bonded to the coated paper sheet at the interstices of the netting.

FIG. 7 is an enlarged perspective view of a multiple-ply warp or weft strand showing a preferred form of a multiple-ply strand wherein adjacent plies of the strand are tacked together only at discrete locations along the strands.

Figures 8, 9A:
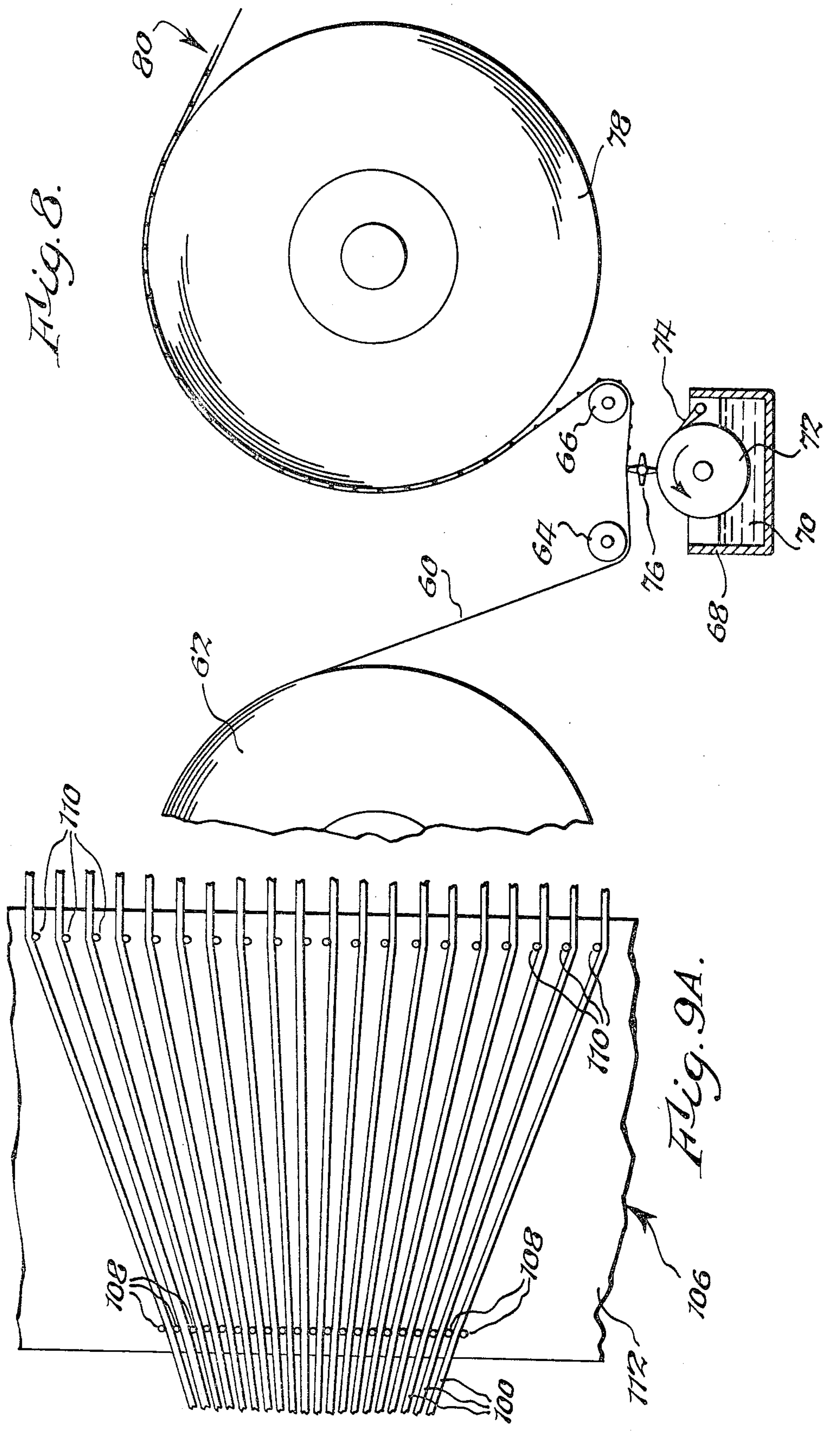

FIG. 8 is a fragmentary schematic view illustrating a method of preparing a multiple-ply tacked or "skip-bonded" strand stock.

Figure 9:
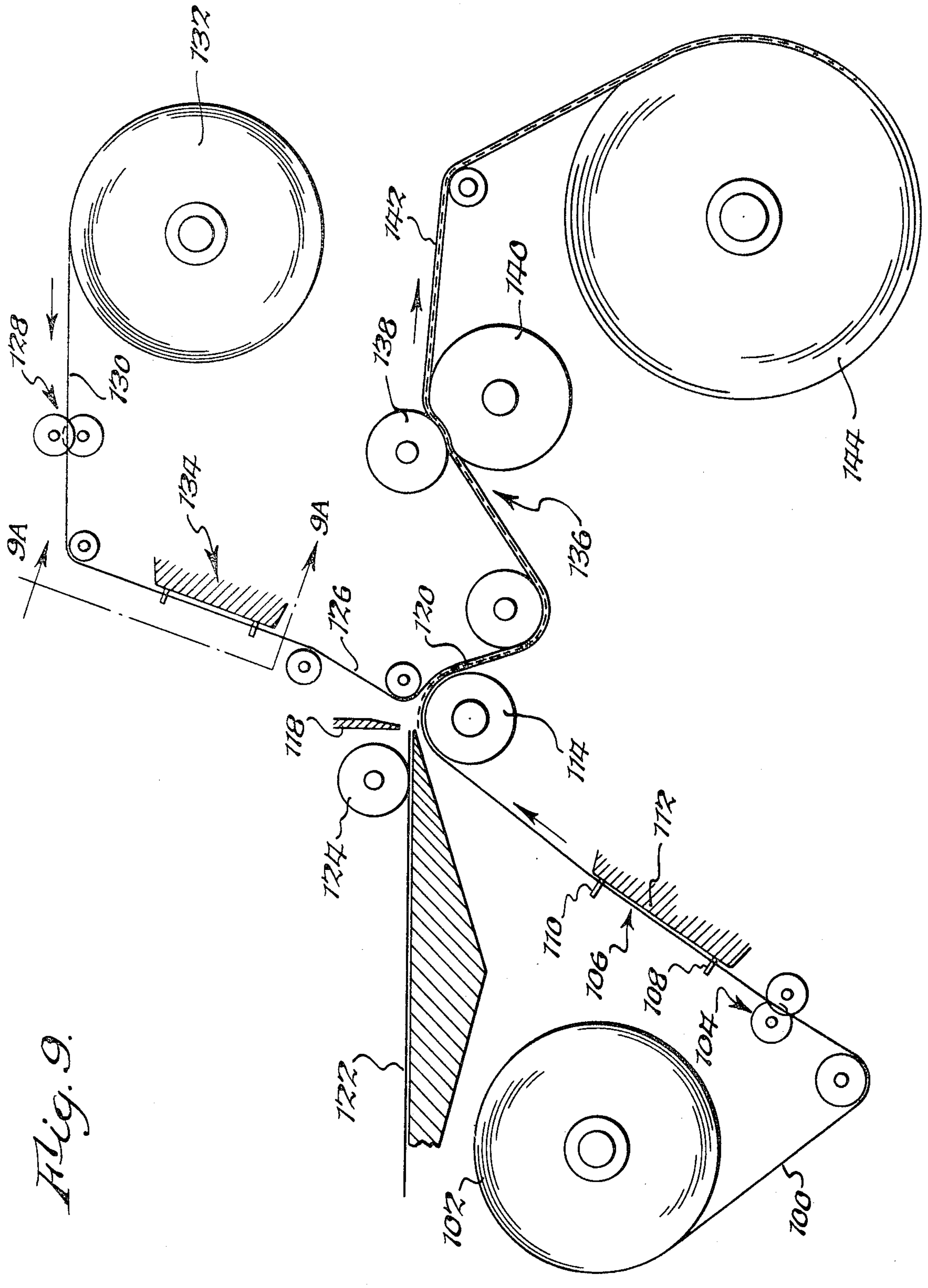

FIG. 9 is a schematic view illustrating a method for producing on a continuous basis the product shown in FIGS. 1 through 4.

FIG. 9A is a fragmentary top view of the warp strand separator shown in FIG. 9.

Figure 10:
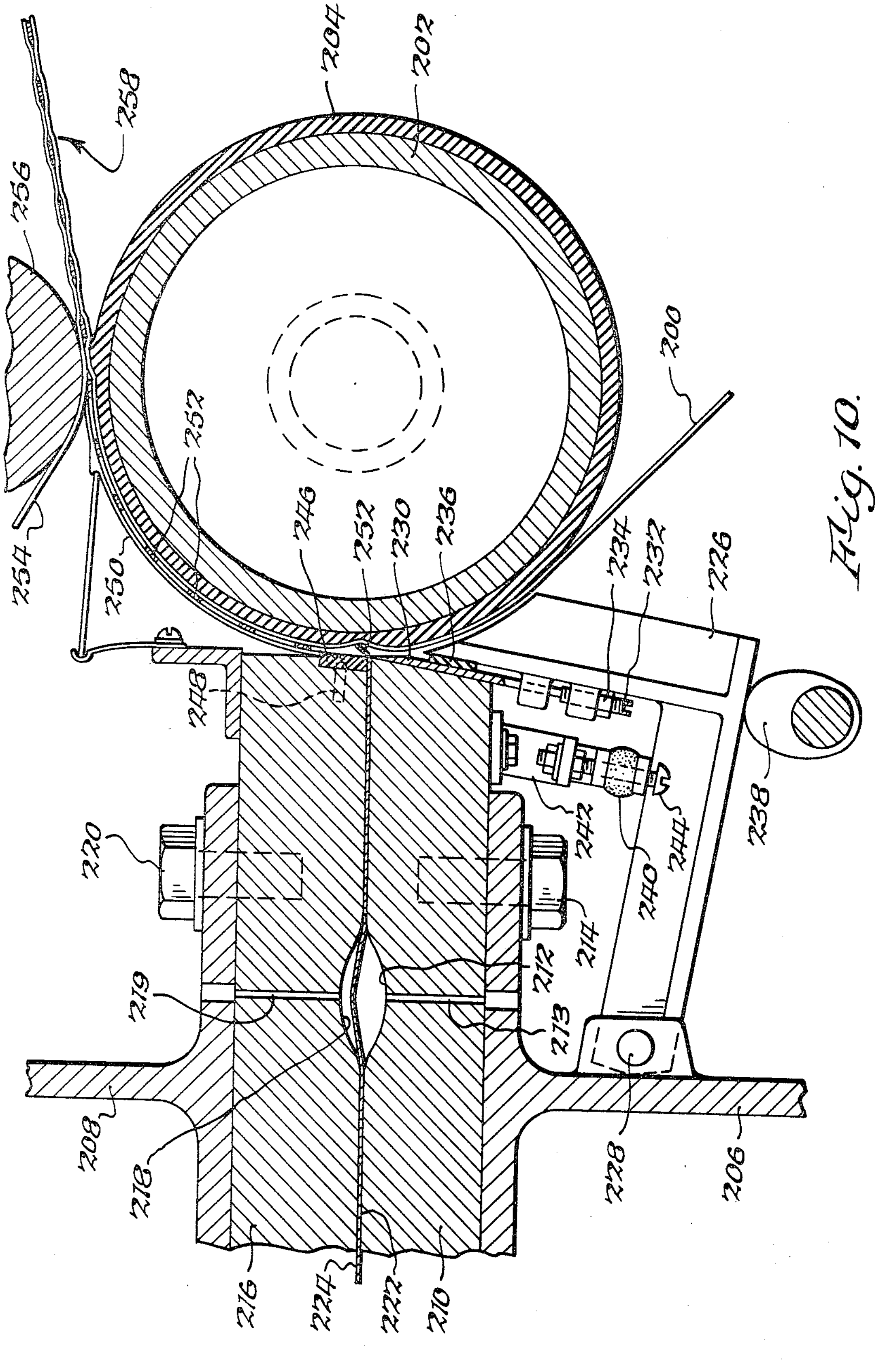

FIG. 10 is a diagrammatic view illustrating a modified method for preparing and assembling the product shown in FIGS. 1 through 4.

Figure 5:
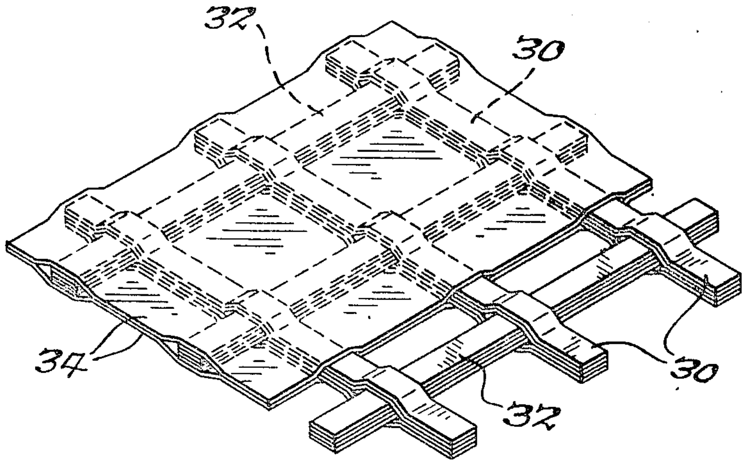
FIG. 5 is an enlarged perspective drawing partially broken away of an integrated laminate according to the present invention comprising two sets of uncoated 2-ply warp strands and one set of uncoated 4-ply weft strands and a sheet of coated paper bonded to each side of the netting of warp and weft strands.
Figure 11:
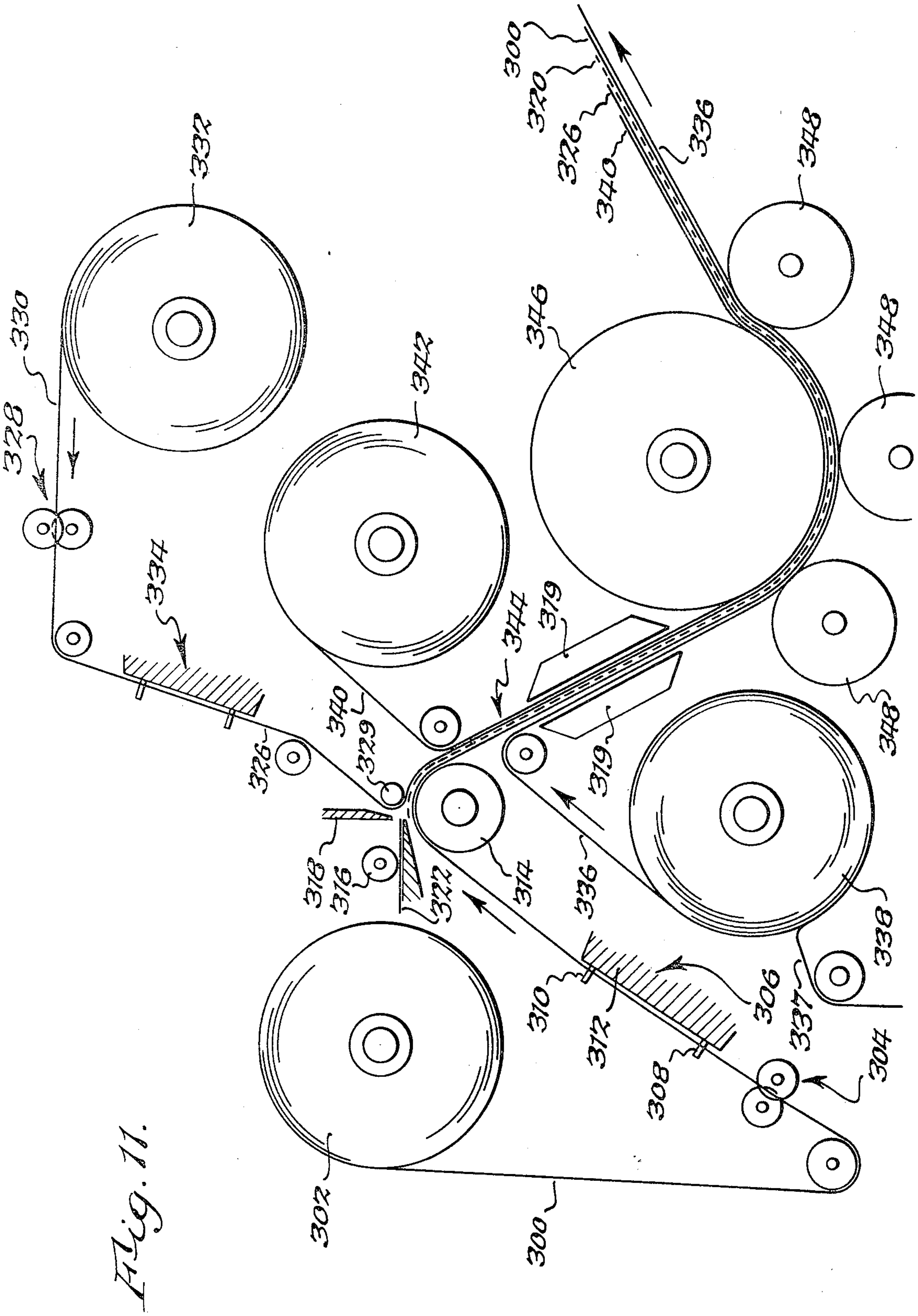

FIG. 11 is a schematic view similar to FIG. 9 illustrating a method for producing on a continuous basis the product shown in FIGS. 5 and 6.

Figure 12:
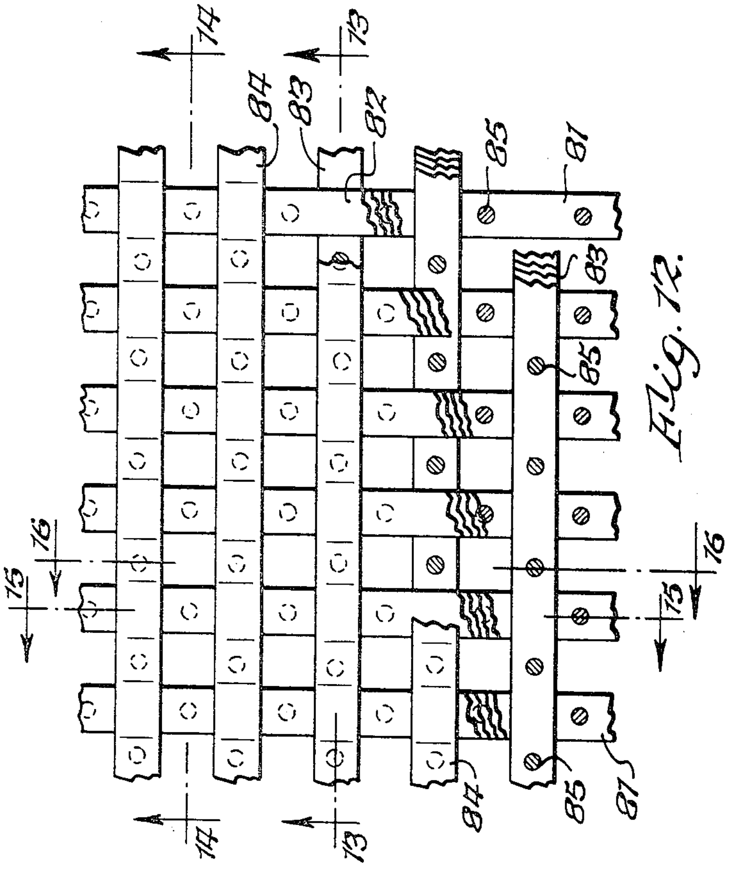

FIG. 12 is an enlarged fragmentary view of an integrated netting according to the present invention comprising two intermittently bonded sets of warp strands and two intermittently bonded sets of weft strands.

Figure 13:
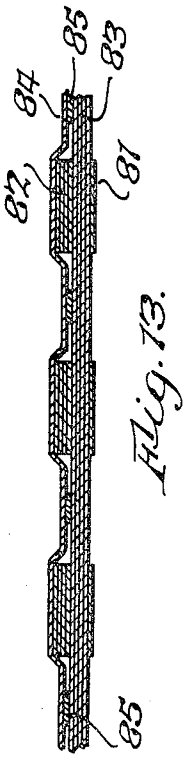

FIG. 13 is an enlarged sectional view taken along line 13—13 of FIG. 12.

Figure 14:
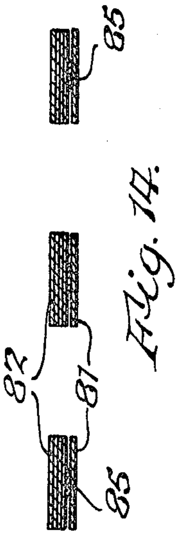

FIG. 14 is an enlarged sectional view taken along line 14—14 of FIG. 12.

Figure 15:
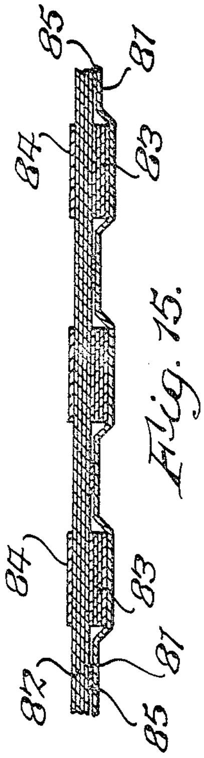

FIG. 15 is an enlarged sectional view taken along line 15—15 of FIG. 12.

Figure 16:
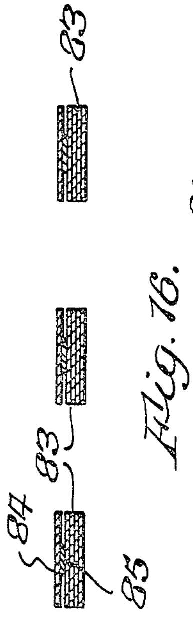

FIG. 16 is an enlarged sectional view taken along line 16—16 of FIG. 12.

Figure 17:
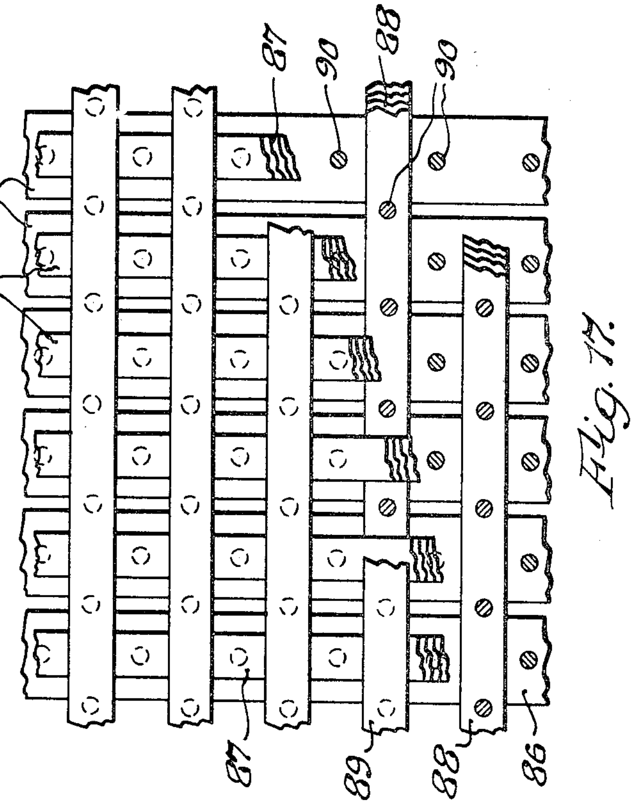

FIG. 17 is an enlarged fragmentary view of another integrated netting according to the present invention and similar to that shown in FIG. 12 except that one of the sets of warp strands is made wider than the other set to provide a netting with narrow interstices.

Figures 18, 19, 20, 21, 22:
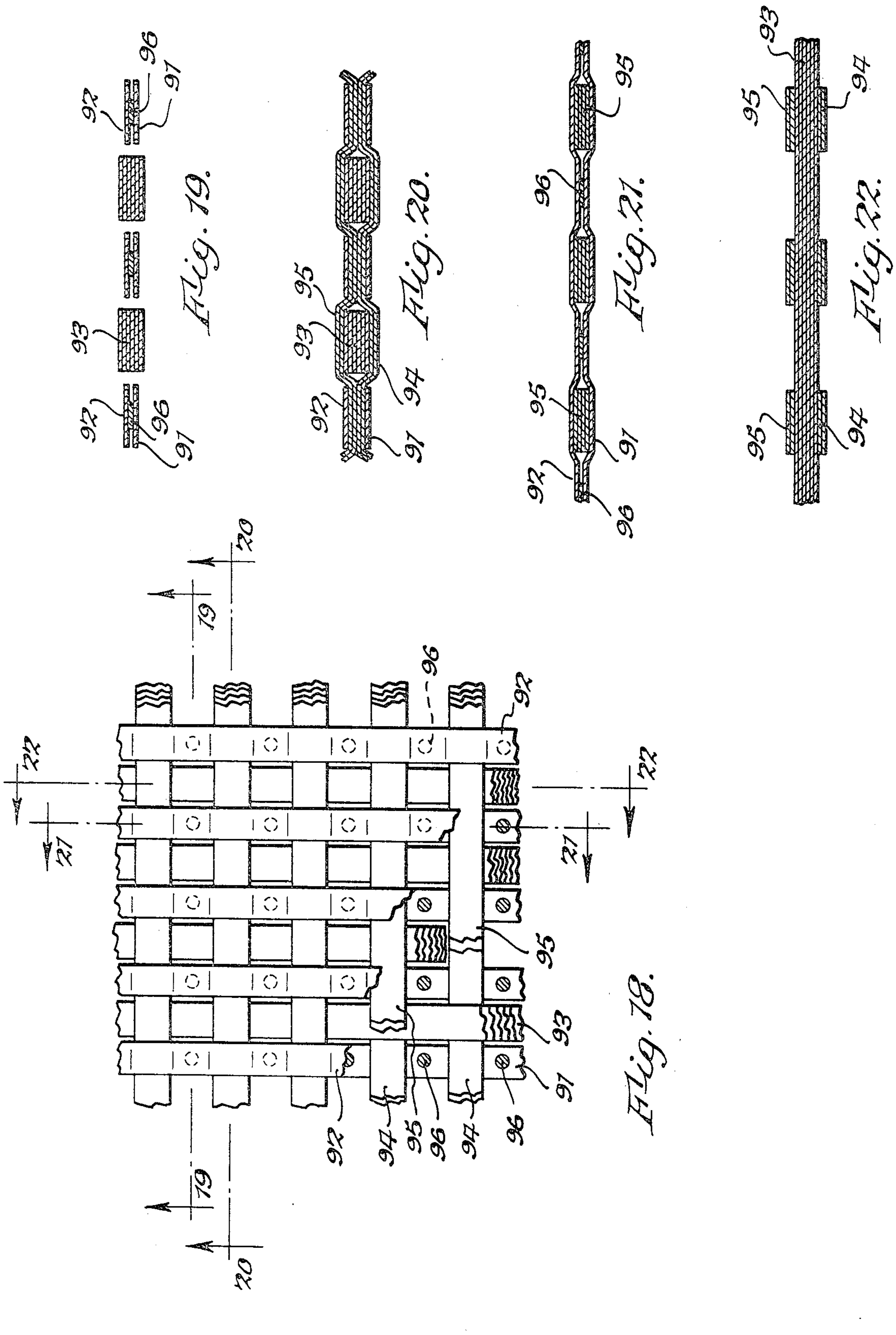

FIG. 18 is an enlarged fragmentary view of still another form of the product according to the present invention comprising two intermittently bonded sets of warp strands and two intermittently bonded sets of weft strands and a third set of warp strands positioned parallel to the first two sets of warp strands and between the two sets of weft strands.

FIG. 19 is an enlarged sectional view taken along line 19—19 of FIG. 18.

FIG. 20 is an enlarged sectional view taken along line 20—20 of FIG. 18.

FIG. 21 is an enlarged sectional view taken along line 21—21 of FIG. 18.

FIG. 22 is an enlarged sectional view taken along line 22—22 of FIG. 18.

Figure 23:
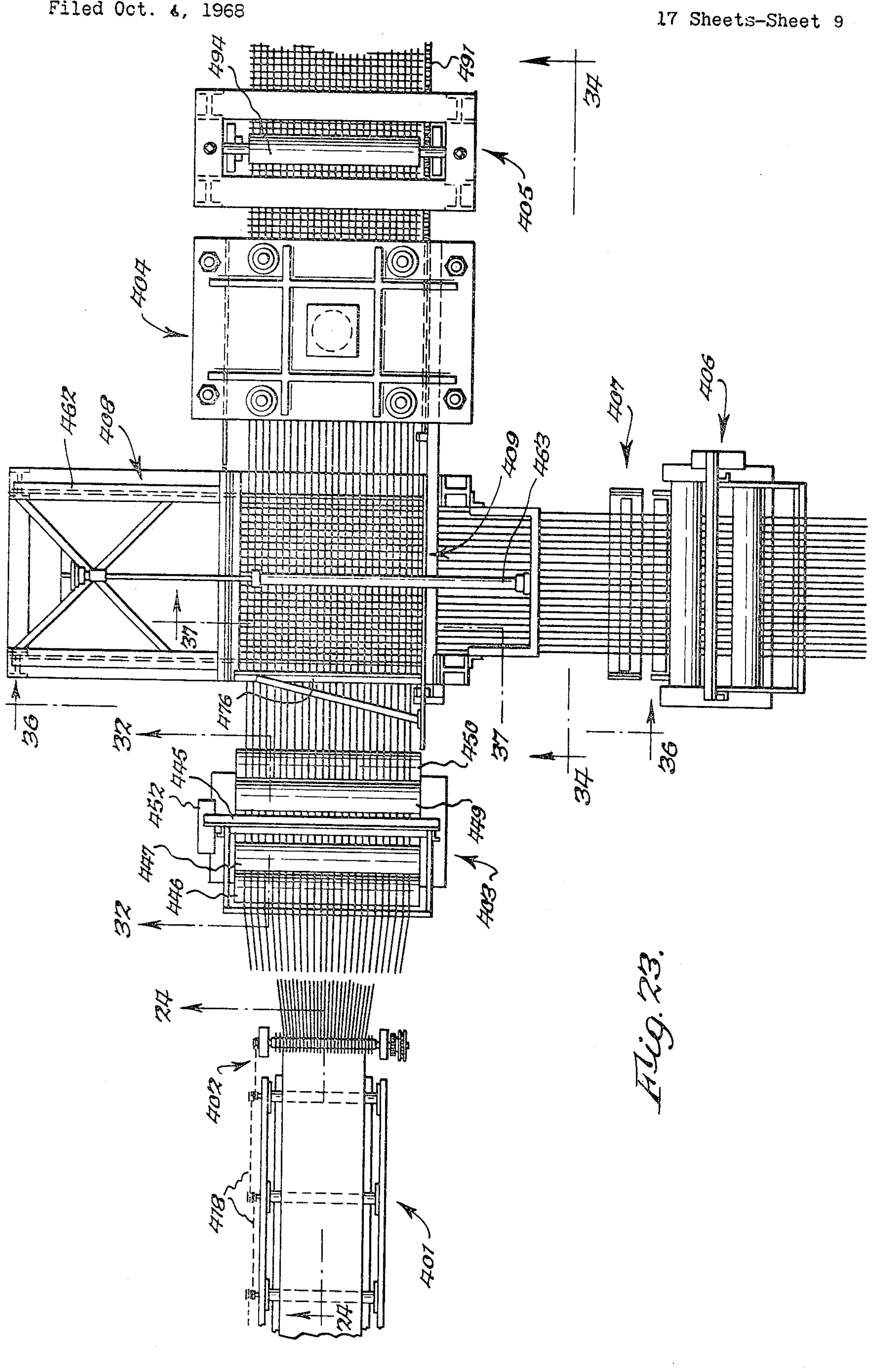

FIG. 23 is a fragmentary plan view of a machine particularly adapted to produce an integrated netting of the type shown in FIGS. 12 through 22.

Figures 24, 25, 26:
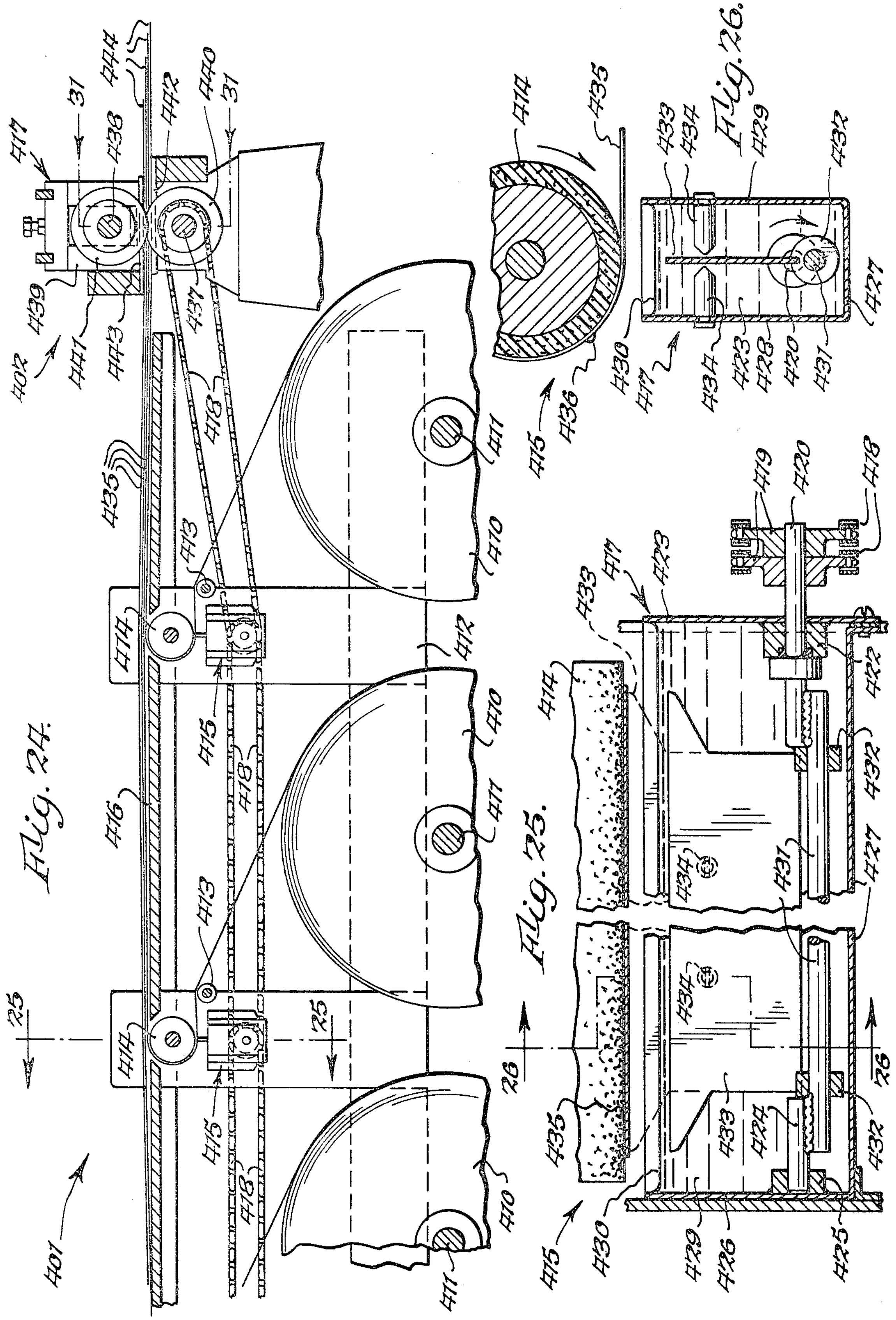

FIG. 24 is a fragmentary vertical section taken along line 24—24 of FIG. 23 showing several strand stock supply rolls, the random gluing mechanism, and a slitter.

FIG. 25 is a fragmentary vertical section taken along line 25—25 of FIG. 24 and showing in more detail the random gluing mechanism.

FIG. 26 is a vertical section taken along line 26—26 of FIG. 25.

Figures 27, 28, 29:
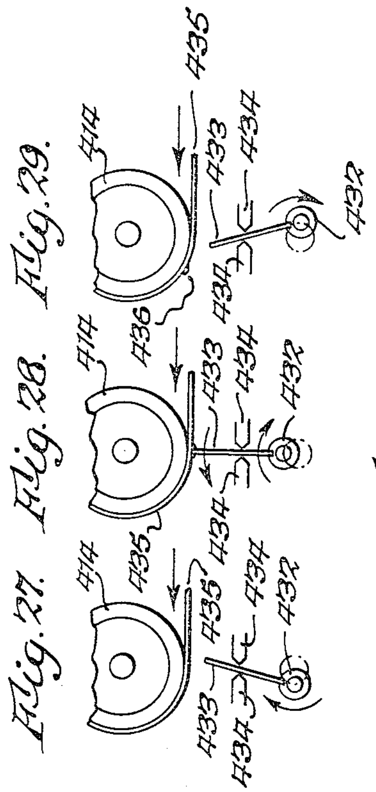

FIGS. 27, 28 and 29 are diagrammatic sketches illustrating three consecutive operating positions of the random gluing mechanism shown in FIG. 26.

Figure 30:
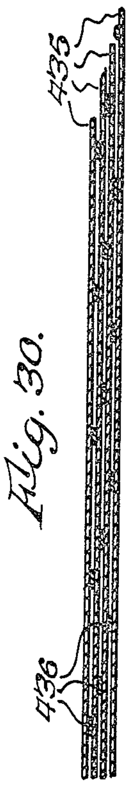

FIG. 30 is an enlarged fragmentary view in longitudinal section of the laminated strand stock material prior to the slitting operation.

Figure 31:
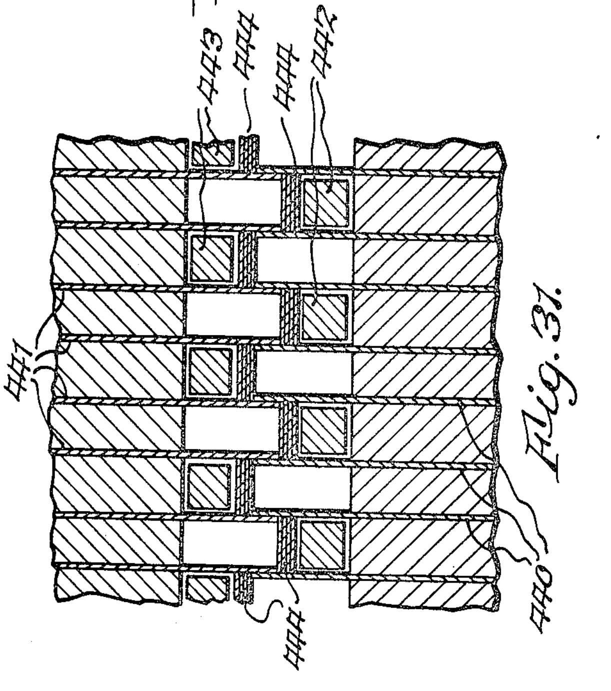

FIG. 31 is an enlarged fragmentary vertical section taken along line 31—31 of FIG. 24 showing a portion of the disc slitter slitting a 4-ply laminate of strand stock.

Figures 32, 33:
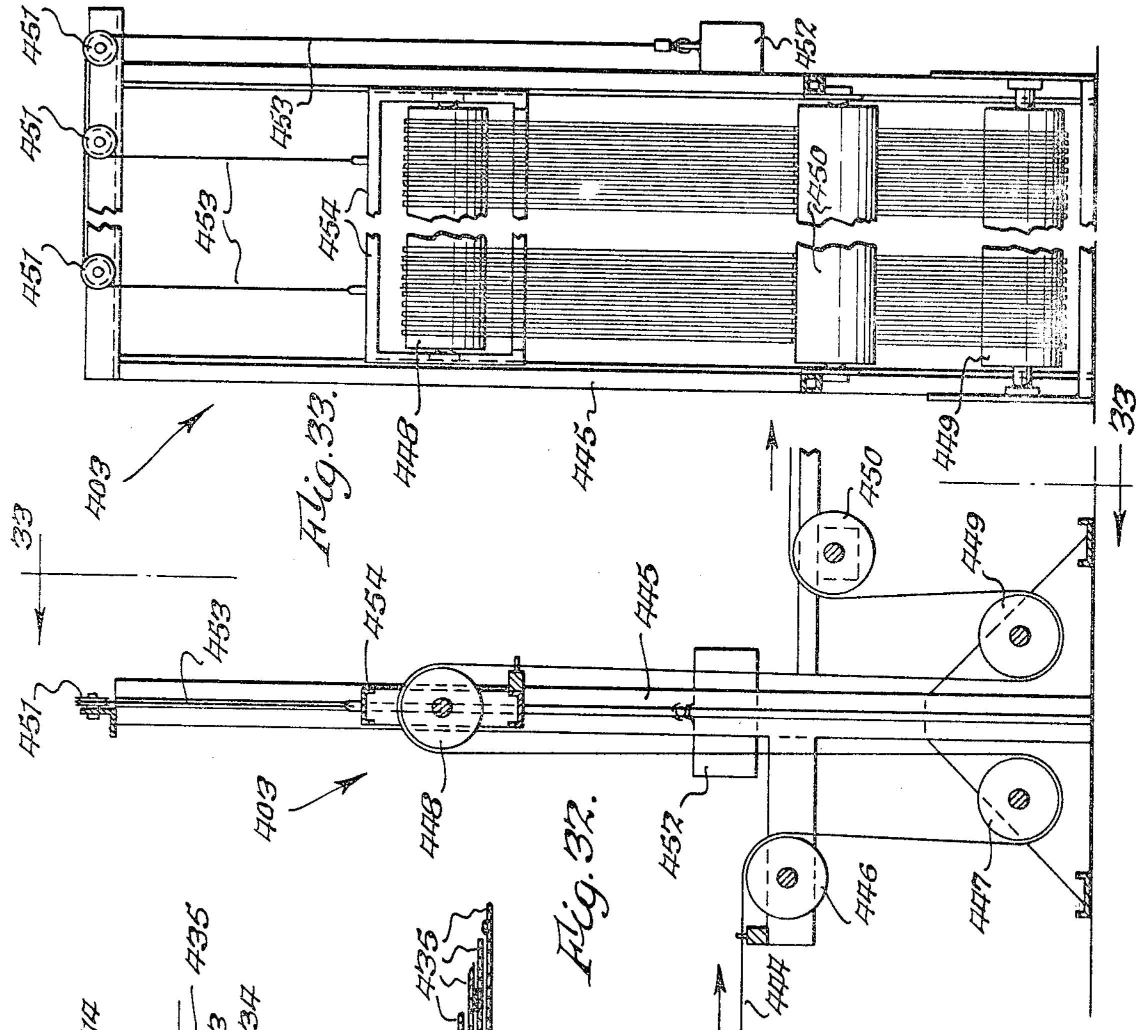

FIG. 32 is a vertical section taken along line 32—32 of FIG. 23 showing a typical accumulator mechanism which may be incorporated in either the warp or weft material feeds.

FIG. 33 is a rear elevation of the accumulator mechanism shown in FIG. 32 taken along line 33—33 of FIG. 32.

Figure 34:
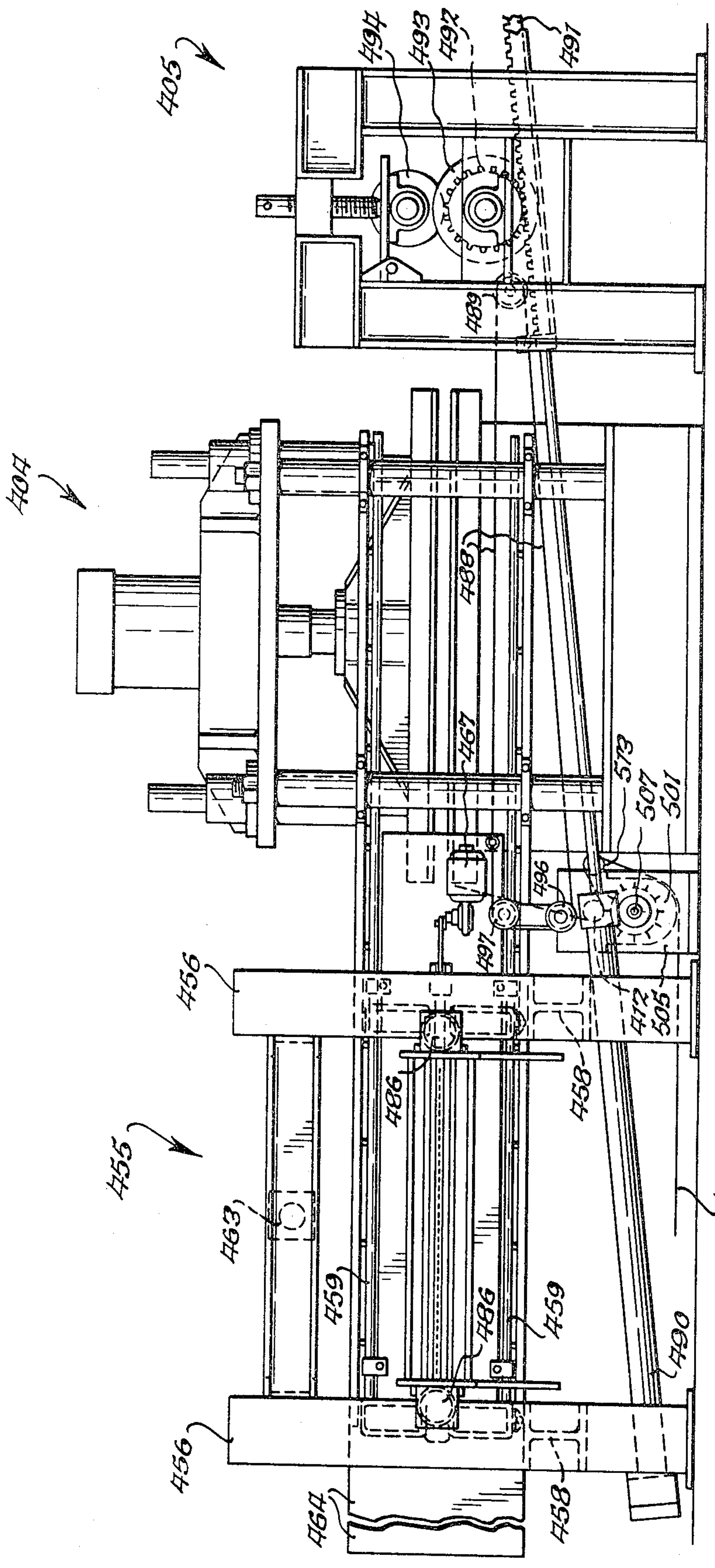

FIG. 34 is a side elevation of the machine taken along the line 34—34 of FIG. 23 and showing the main section of the machine with the warp advance mechanism at the extreme right.

Figure 35:
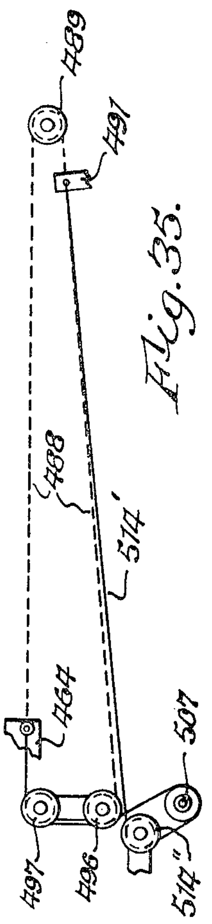

FIG. 35 is a fragmentary view similar to FIG. 34 showing in more detail the drive cable for the spot gluing mechanism for the bottom ply of the warp material.

Figure 36:
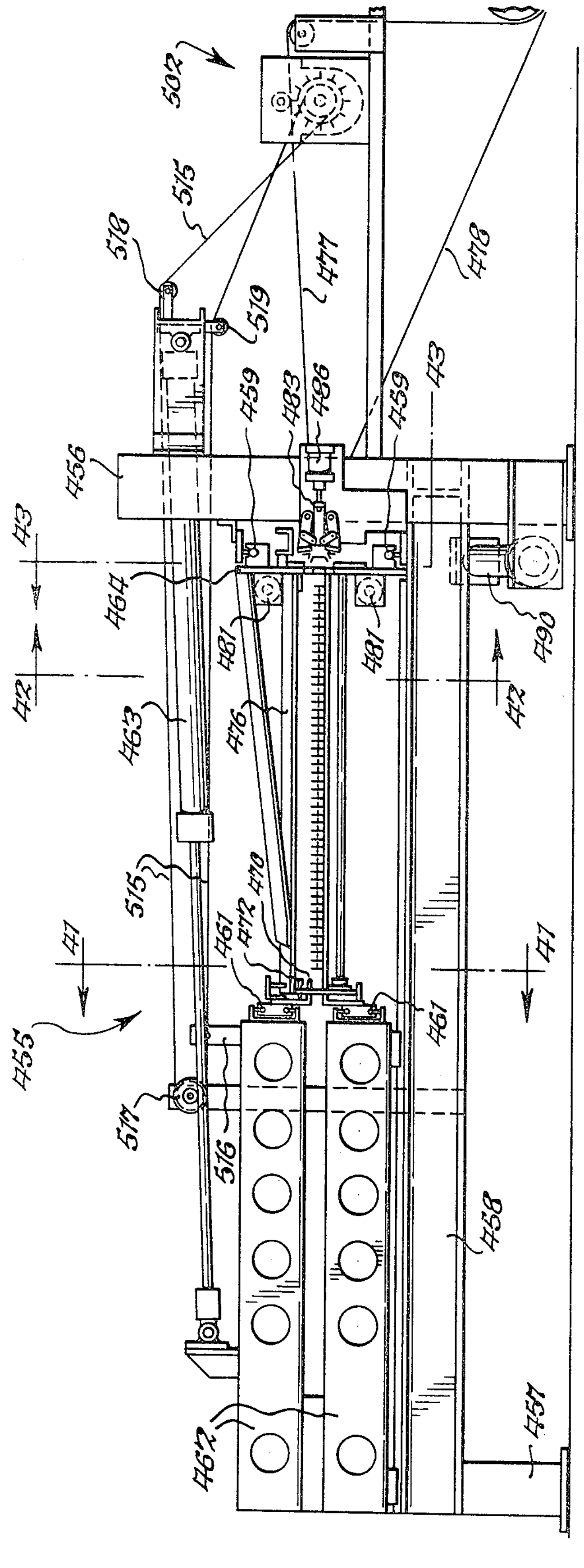

FIG. 36 is a vertical cross-section taken along line 36—36 of FIG. 23 showing the weft carriage mechanism in its extreme left position. The creel clamps, a spot gluing mechanism, and a portion of the accumulator are shown at the right of the figure.

Figures 37, 38:
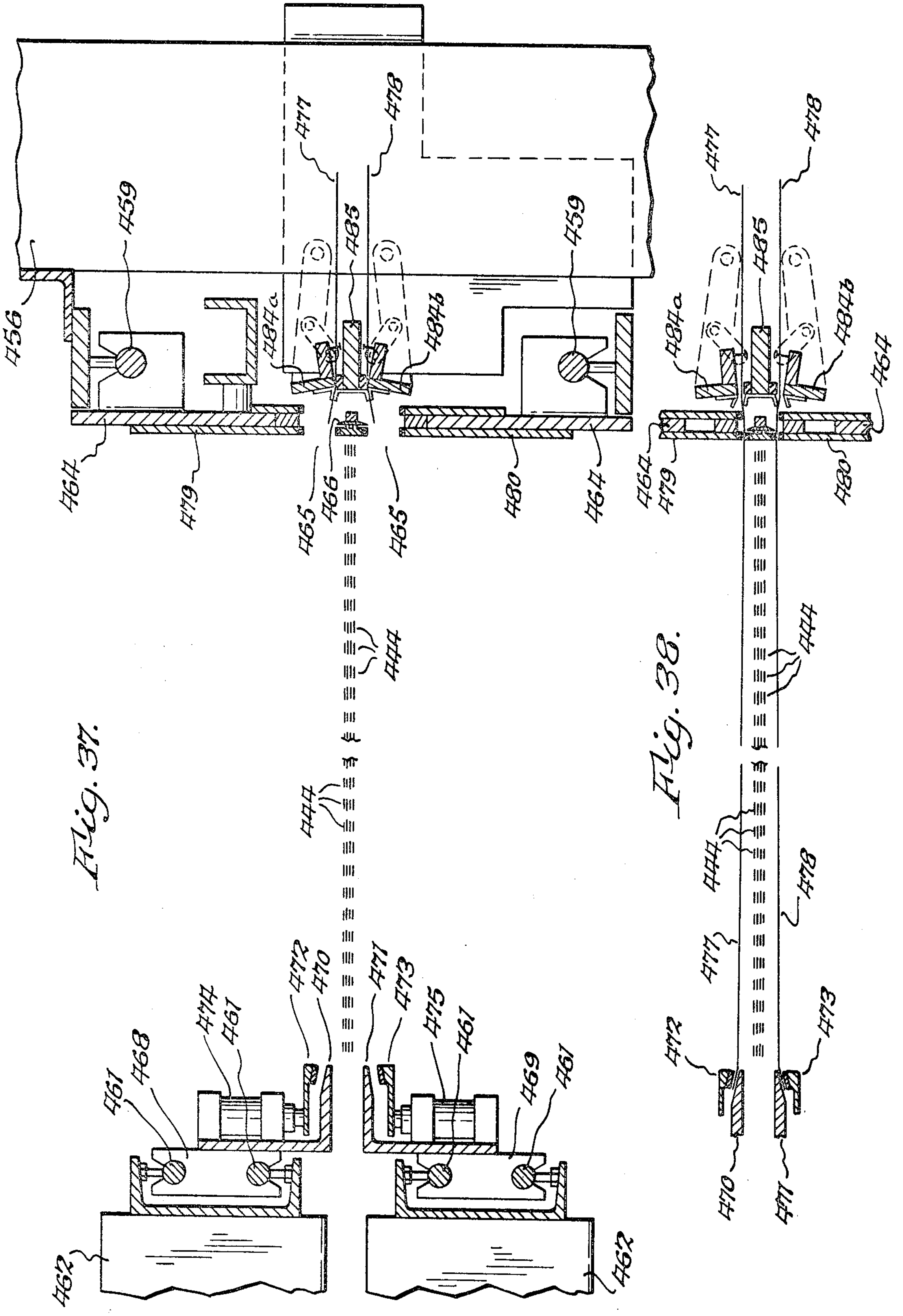

FIG. 37 is an enlarged vertical cross-section taken along lines 37—37 of FIG. 23.

FIG. 38 is a fragmentary view similar to FIG. 37 but showing the weft strands being drawn across the warp strands by the movable carriage.

Figures 39, 40, 41:
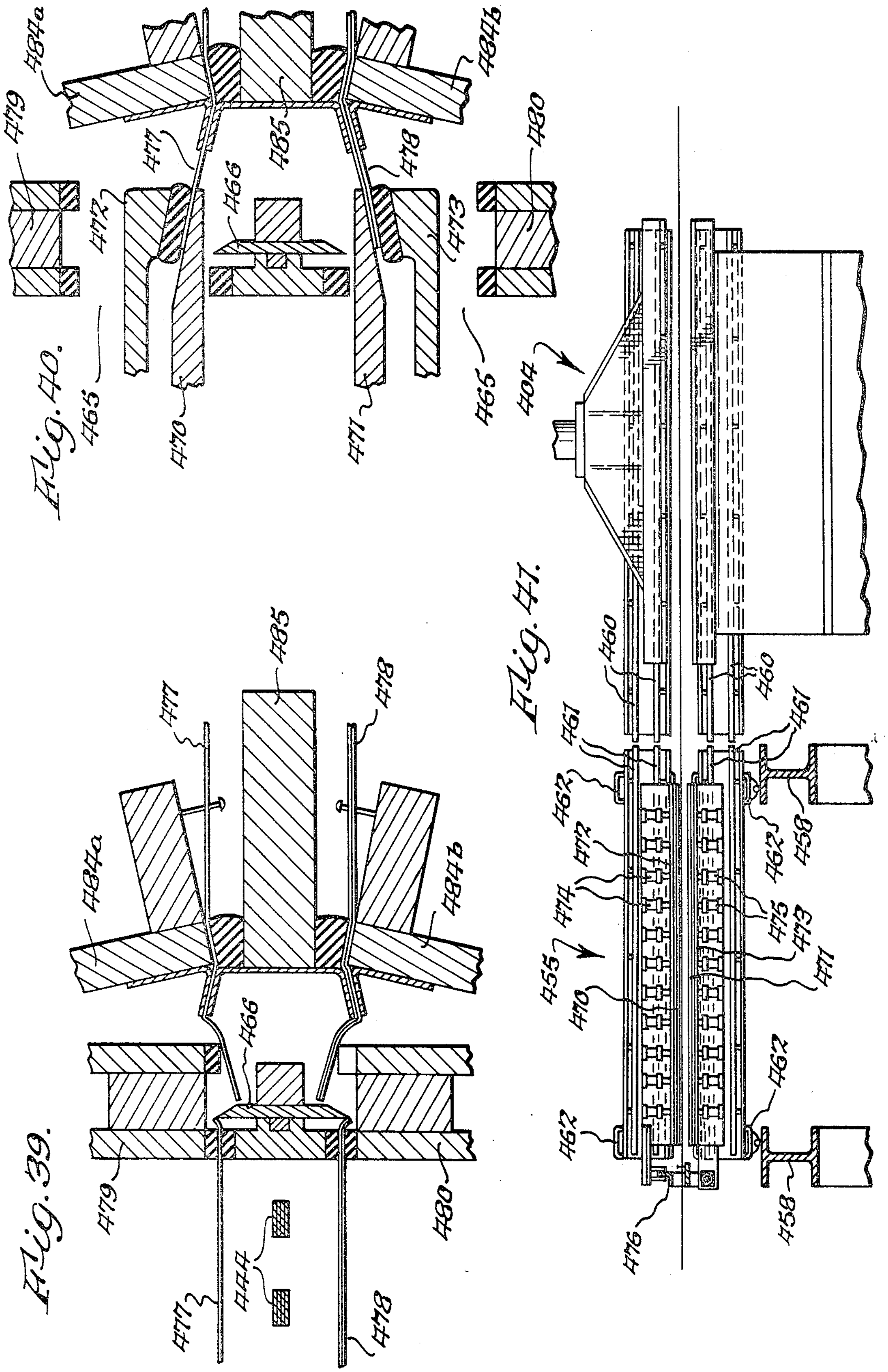

FIG. 39 is an enlarged view of a portion of the machine shown in FIG. 37 illustrating the cutting of the weft strands by a reciprocating knife.

FIG. 40 is a similar view showing the carriage mounted clamp jaws just gripping the weft strands.

FIG. 41 is a vertical section taken along line 41—41 of FIG. 36 showing, at the left, the carriage clamp jaws and, at the right, the press.

Figure 42:
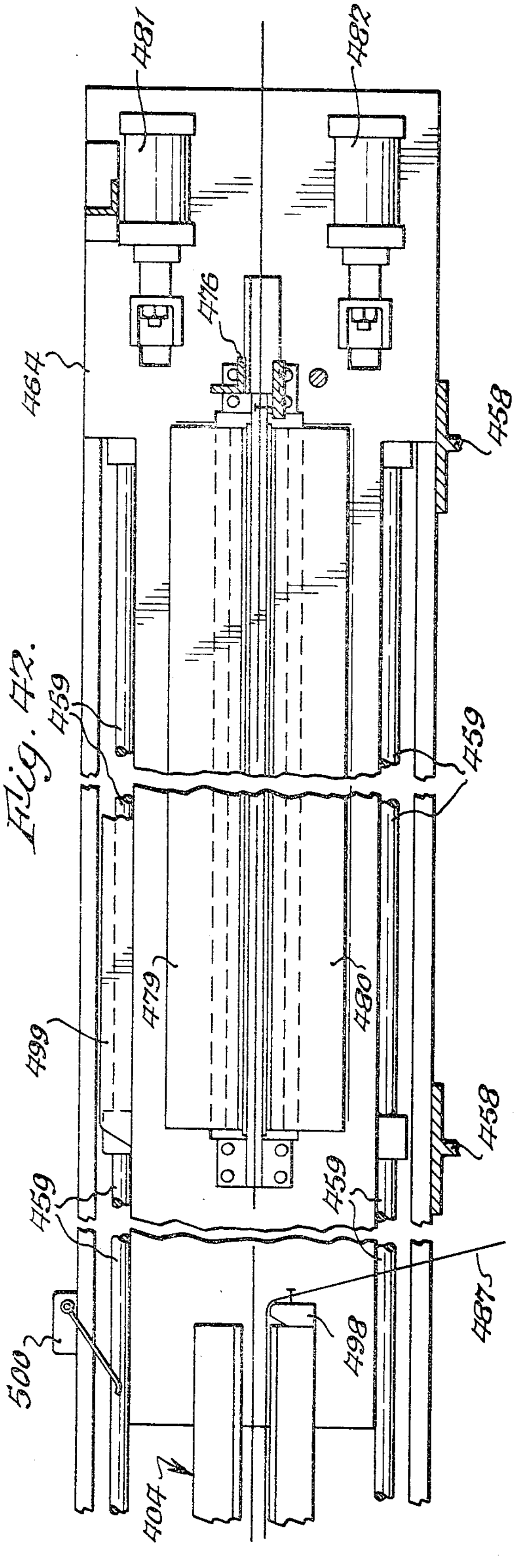

FIG. 42 is a vertical section looking in an opposite direction to that of FIG. 41.

Figure 43:
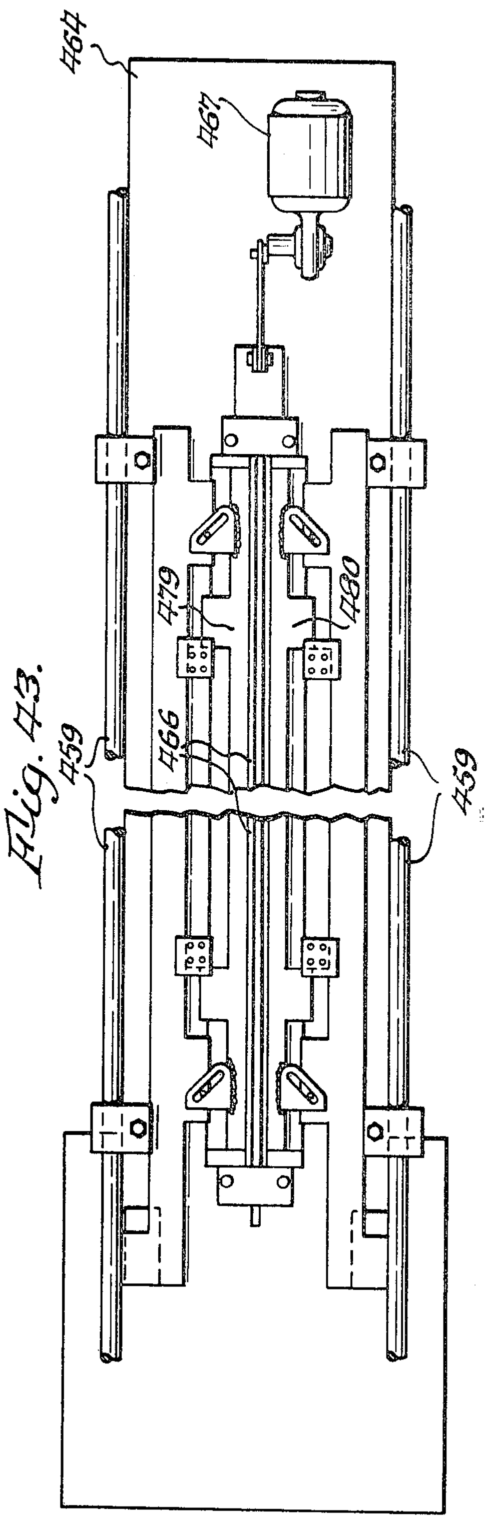

FIG. 43 is a vertical section taken along line 43—43 of FIG. 36 showing the reverse side of the clamping and cut-off mechanism illustrated in FIG. 42.

Figures 44, 45, 46, 47:
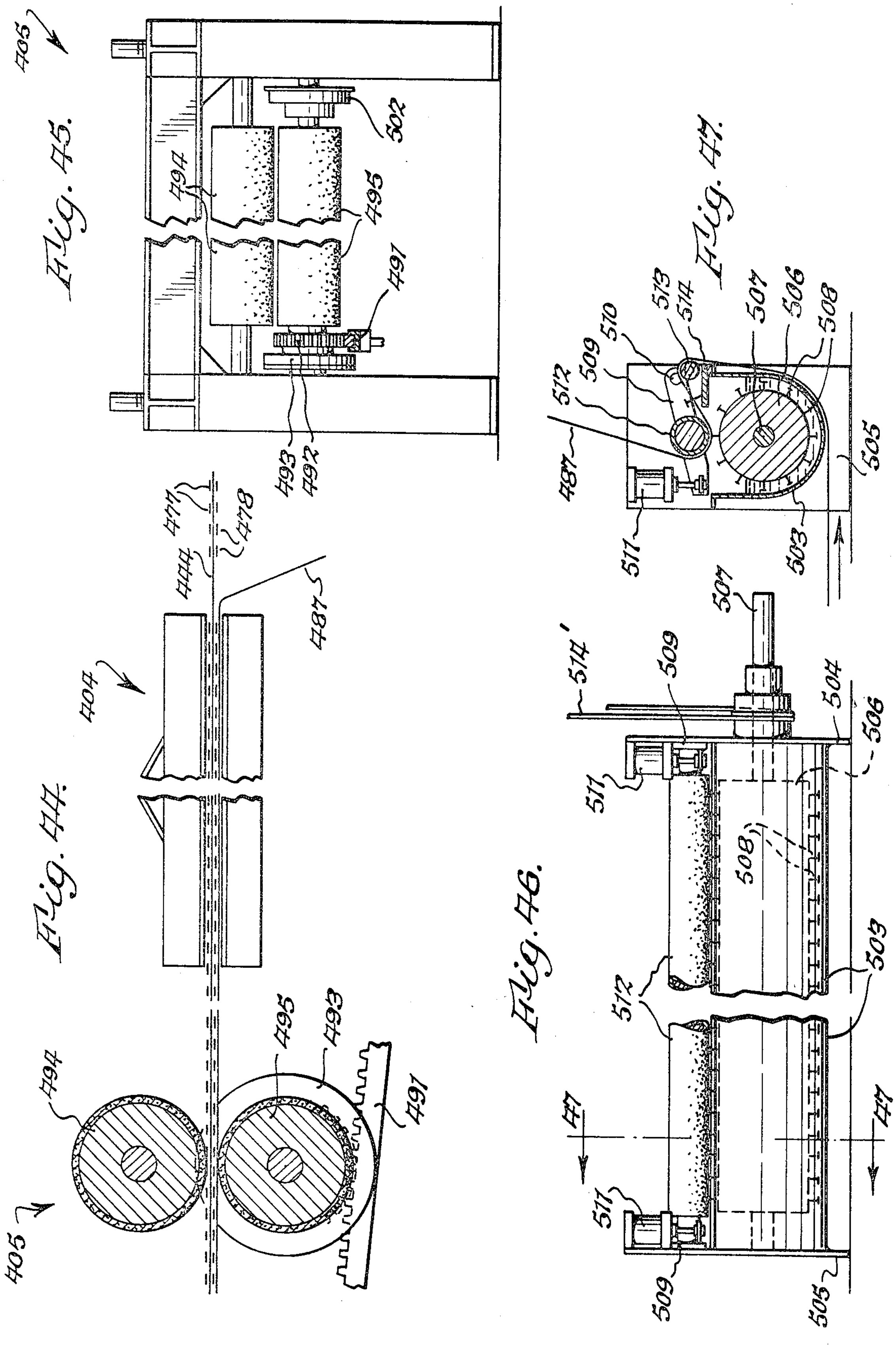

FIG. 44 is a schematic view showing, on the right, the press and, on the left, the warp advance mechanism which draws the finised product from the press.

FIG. 45 is an elevation of the right end of the machine as shown in FIG. 23 and illustrating, in more detail, the warp advance mechanism.

FIG. 46 is an enlarged longitudinal section through the spot gluing mechanism also shown in FIGS. 34 and 36; and FIG. 47 is a cross-section taken along lines 47—47 of FIG. 46.

Figure 1:
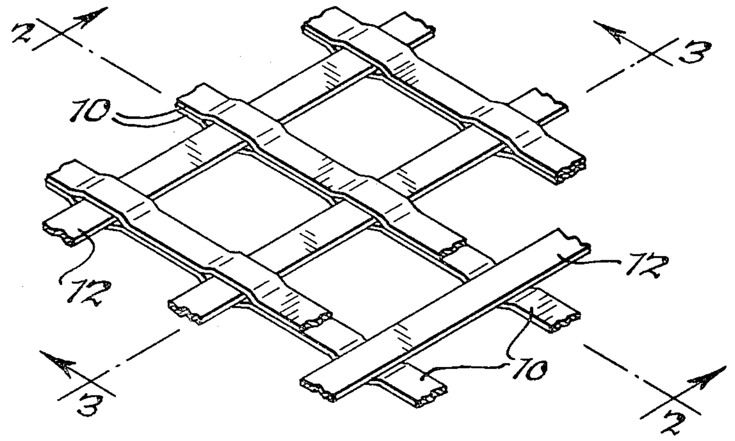
FIG. 1 is an enlarged perspective drawing of an integrated netting according to the present invention comprising two intermittently bonded sets of warp strands and one set of unbonded weft strands.
Figure 2:
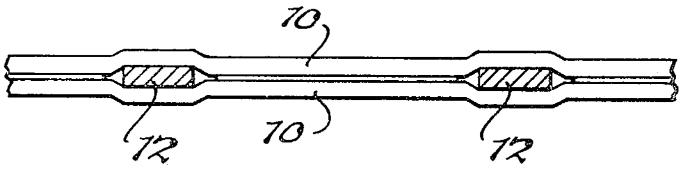
FIG. 2 is an enlarged sectional view taken along the line 2—2 of FIG. 1.
Figure 3:
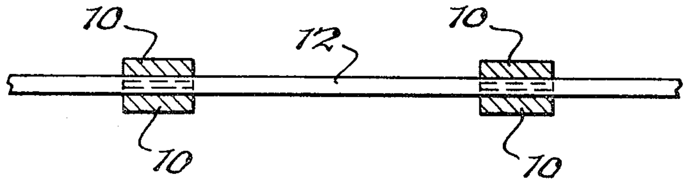
FIG. 3 is an enlarged sectional view taken along line 3—3 of FIG. 1.
Figure 4:
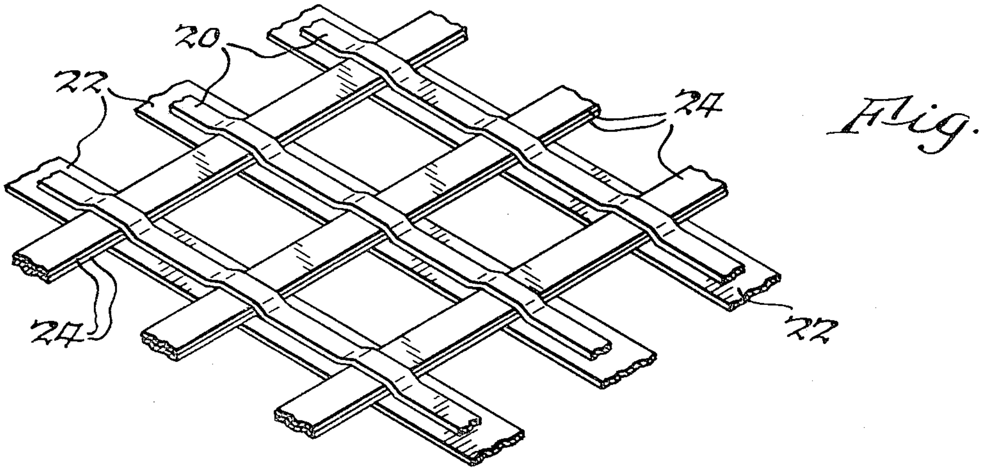
FIG. 4 is an enlarged perspective drawing of an integrated netting according to the present invention comprising two intermittently bonded sets of warp strands and one set of 2-ply weft strands, wherein one of the sets of warp strands comprises narrow strands of heavy basis weight coated paper and the other set of warp strands comprises wide strands of lower basis weight paper.

Referring now to the drawings, FIGS. 1 through 6 illustrate four forms of the integrated netting made in accordance with the present invention. In FIGS. 1 through 3, the netting comprises two sets of warp strands 10 and one set of weft strands 12, while in FIG. 4 the netting comprises one set of narrow warp strands 20 one set of wide warp strands 22 and one set of weft strands 24.

In FIG. 5, a netting is shown comprising two sets of multiple-ply warp strands 30 and one set of multiple-ply weft strands 32 sandwiched between two sheets of paper 34, at least one of which is coated. The netting of FIG. 5 is designed for substantially equal strength in the longitudinal and transverse directions by providing an equal number of strand plies in each direction. In this modification, the coated side of the paper sheet 34 is placed adjacent to the netting so that when the assembly of strands and sheets is passed through a compression stage the paper sheets are bonded together to form an integrated laminate. As the coating on one or both of the paper sheets provides the necessary bonding agent, it is unnecessary to bond separately the warp and weft strands. Consequently, both the warp and weft strands may be prepared from uncoated paper or plastic stock.

FIG. 6 illustrates another modification of the product of the present invention having a netting comprising one set of multiple-ply strands 40, one set of multiple-ply weft strands 42, a sheet of coated kraft paper 44 disposed on one side of the netting and thin plastic film 46 disposed on the other side of the netting. As in the product shown in FIG. 5, the coated sheet is bonded both to the netting and the plastic film by the coating during the compression stage of the process.

The integrated laminates shown in FIGS. 5 and 6 are particularly desirable for applications requiring a heavy-duty water-resistant covering, for example, coverings for open-top railroad cars or open-top trucks used for the shipment of loose granulated products. Such an integrated laminate may also be advantageously used to protect machinery or other freight shipped in railroad flat cars or flat bed trucks.

In FIGS. 1 through 3, the warp and weft strands are shown as identical in size and shape and comprise a single strip of relatively heavy basis weight paper, for example, 40 pounds to 200 pounds. The strands may be of any desired width, for example, 1/16 inch to 1 inch and the spacing of the strands may be varied, depending on the desired end use to provide an opening between the strands from 1/16 inch to 1 inch or more. Of course, the strands may also be formed from plastic material.

Where greater strand bulk and toughness may be required than can be obtained by the use of a single sheet of heavy paper or plastic the strands may be cut from a multiple-ply strand stock. Such a multiple-ply strand is illustrated in FIG. 7. Strand stock comprising five or six or more sheets of heavy basis weight paper or plastic has been found to be particularly useful in this circumstance. Where the strands are cut from multiple sheets it is desirable, for purposes of processing, to bond the sheets together prior to forming the strands by shearing or slitting. However, if the sheets are bonded together over their entire surfaces the strands slit therefrom may be excessively rigid so as to decrease the toughness of the final netting. This difficulty may be obviated by bonding the sheets along a series of lines approximately perpendicular to the direction of shearing or slitting, so that each multiple strand will be bonded only at discrete locations between adjacent plies. Referring to FIG. 7, the individual plies 50 are bonded at discrete points 52 by an adhesive. This method of preparing the multiple-ply sheet stock is known as "skip-bonding" and is illustrated schematically in FIG. 8.

In FIG. 8, a strip 60 is withdrawn from the supply roll 62 and passed under two small parallel idler rolls 64 and 66. A pan 68 containing adhesive 70 is located beneath the idler rolls 64 and 66. A driven coating roller 72 is mounted within the pan 68 and driven so as to pick up adhesive 70 from the pan. The amount of adhesive 70 carried by the roller 72 is metered by a doctor blade 74 so as to control the amount of adhesive that may be picked up by a driven finned applicator 76 positioned between the coating roller 72 and the paper strip 60. The finned applicator 76 thus applies adhesive in a series of transverse or cross machine direction lines across the moving strip 60. After passing around the idler roll 66 the adhesive coated strip 60 passes around a second roll of paper 78 and is bonded thereto to form 2-ply skip-bonded stock 80.

It will be apparent that stock comprising any number of plies may be formed by passing the stock through successive stages of adhesive application and adding additional strips to the stock. The multiple-ply stock may then be sheared or slit into skip-bonded strands for use in the netting of the present invention.

FIGS. 1 through 6 illustrate forms of the netting made in accordance with the present invention which involve one or two warp strands and one set of weft strands. In certain circumstances, it may be desirable to provide an integrated netting having two or three sets of warp strands and two sets of weft strands. Such a construction is shown in FIGS. 12 through 22.

Referring now to FIG. 12, a first set of warp strands is indicated at 81 while a second set of warp strands overlying the first is shown at 82. The first set of weft strands is indicated at 83 and the second set of weft strands overlying the first set is indicated at 84. The first and second sets of warp strands are bonded together intermediate the weft strands by adhesive applied at discrete points 85 along the warp strands. Similarly, the two sets of weft strands are bonded intermediate the intersections with the warp strands by another series of adhesive spots 85. As is most clearly shown in FIGS. 13 through 16, the outer sets of strands are formed of single-ply material while the interior sets of strands are formed from multiple-ply material. The multiple-ply material may be skip-bonded material as hereinbefore described, or it may be formed on the same machine which is used to form the integrated netting itself.

FIG. 17 illustrates another form of the integrated netting of the present invention which is similar to that shown in FIG. 12 with the exception that one of the sets of warp strands is made wider than the other set of warp strands whereby the interstices between the warp and weft strands are made smaller. In FIG. 17, the first or wide set of warp strands is indicated at 86, while the second or narrow set of warp strands is shown at 87. The weft strands are indicated at 88 and 89 and the spot of adhesive by which each pair of sets of strands is adhered together is shown at 90. It will be seen that the integrated netting of FIG. 17 is similar to that of FIG. 4 except that a second set of weft strands has been added.

Turning now to FIG. 18, another form of the integrated netting is there shown. The distinguishing feature of this netting is that a third set of warp strands has been added intermediate the first and second set of warp strands. Referring to FIGS. 18 through 22, the first set of warp strands is shown at 91, while the second and overlying set of warp strands is indicated at 92. The first and second sets of warp strands are adhered together at discrete points intermediate the weft strands by spots of adhesive 96. The third set of warp strands 93 is positioned parallel to but not overlying the first and second sets of warp strands 91 and 92. The first and second sets of weft strands are shown at 94 and 95, respectively.

The integrated netting illustrated in FIGS. 18 through 22 may be formed by laying down the first set of warp strands 91 followed by the first set of weft strands 94.

Next, the third set of warp strands 93 is laid down parallel to the warp strands 91. Following this, the second set of weft strands 95 is laid down in parallel overlying relationship to the first set of weft strands. The construction is completed by laying down the second set of warp strands 92 in parallel overlying relationship to the first set of warp strands 91.

It will be apparent that wherever a single-ply of paper is shown in FIGS. 1–6 and 12–22, it is possible to use a multiple-ply strand and vice versa. It is therefore possible to design a netting having equal strength in the longitudinal and transverse directions by having an equal number of strands of the same thickness in each direction, or the strength in a particular direction may be enhanced by placing more strands in that direction. In the practice of the present invention it is not necessary that the warp and weft strands be of the same width and thickness. Thus, if it is desired to use the 3-ply construction as shown in FIGS. 1 through 3, but yet provide an integrated netting having equal strength in the longitudinal and transverse directions the warp strands 10 may be slit, for example, from the single-ply stock while the weft strands 12 are sheared from 2-ply skip-bonded stock. If it is desired in the 3-ply structure of FIGS. 1 through 3 to maintain equal strength in the longitudinal and transverse directions without increasing the bulk, i.e. the thickness of the netting, the width of the weft strands 12 may be sheared double the width of the warp strands 10. It is therefore apparent that consideration of the desired bulk and strength characteristics of the integrated netting will enter into the determination of the optimum strand dimension. Of course, the strand spacing which also affects the strength of the netting may be determined by the end use of the netting. For example, if the netting is to be used as a bag or car cover, for relatively fine granulated products, the fine mesh resulting from close strand spacing may be required, whereas, if the product to be contained by the bag or cover is relatively coarse, as for example, wood chips, a relatively wider strand spacing may be used.

The integrated netting in the form shown in FIGS. 1 through 4 and 12 through 22 requires no backing material in order to maintain the integrity of the structure, although as indicated in the FIGS. 5 and 6 a backing material in sheet form may be applied to one or both sides as desired.

A 3-ply netting such as that shown in FIG. 1 and formed from paper stock displays a number of improved properties when compared with ordinary paper of the same composition and basis weight: For example, the resistance to tearing of the 3-ply netting may be about nine times as great as that of the unconverted paper. Additionally, the 3-ply netting while being dimensionally stable in the longitudinal and transverse directions is capable of 10 to 30 percent extensibility when strained on the bias. The 3-ply netting thus resembles a conventionally woven material with respect to bias extensibility and also with respect to its open fabric-like construction. On the other hand, since the netting is internally bonded it has excellent integrity and cannot ravel as do woven or knitted materials.

Another advantage of the integrated netting of the present invention arises from the fact that the exposed strands of the fabric are flat instead of being twisted as in the case with woven or knitted materials. The flat exposed surface of the strands provides a relatively good printable surface on the netting in the event that it is desired to print a message or design on the surface of the netting.

The integrated laminate of the type shown in FIG. 5, formed with paper strands, has a number of advantages compared with a multi-wall paper construction having a similar material cost as shown by the following example: An integrated laminate, according to present invention, was constructed comprising two sets of warp strands and one set of weft strands laminated with asphalt between two sheets of kraft paper. Each warp strand comprised 2-plies of 100-pound basis weight extensible kraft paper slit to 3/32 inch width and each weft strand comprised 4-plies of 100-pound basis weight extensible kraft paper, also slit to 3/32 inch width and placed between the two sets of warp strands. The warp and weft strands were assembled on 1/2 inch centers to provide an opening or mesh between the strands approximately 13/32 inch square. The netting was then laminated between two sheets of 40-pound basis weight extensible kraft paper coated with 90 pounds of asphalt per 3000 square feet.

The comparable but conventional multi-wall paper construction comprised 2-plies of 50-pound extensible kraft paper, 1-ply of an asphalt lamination consisting of two sheets of 35-pound extensible kraft paper laminated with 30 pounds of asphalt per 3000 square feet and 1-ply of 40-pound extensible kraft paper. The multi-wall construction required 210 pounds of paper per 3000 square feet and 30 pounds of asphalt compared with 230 pounds of paper and 90 pounds of asphalt for the integrated paper fabric according to the present invention. However, since the integrated paper fabric was made from 100-pound kraft paper, which is cheaper than the lighter paper used in the conventional multi-wall construction, the cost of material for the two products was essentially the same.

The two products were tested for tensile strength, snag resistance, cut resistance and tear resistance with results as shown in Table I below:

TABLE I

| Test | Pounds | |
|---|---|---|
| | Conventional multi-wall paper | Integrated paper fabric lamination |
| Tensile strength: | | |
| Longitudinal | 352 | 248 |
| Transverse | 228 | 217 |
| Snag resistance: | | |
| Longitudinal | 15.4 | 78 |
| Transverse | 12.8 | 69 |
| Cut resistance: | | |
| Longitudinal | 13.1 | 52.8 |
| Transverse | 11.1 | 49.8 |
| Tear resistance: | | |
| Longitudinal | 2.9 | 30.6 |
| Transverse | 3.0 | 25.9 |

The tests referred to above were performed in the following manner: The tensile strength was determined by pulling a 4-inch wide specimen at a rate of 1 inch per minute until the specimen ruptured and recording the force in pounds at rupture. Snag resistance was determined by measuring the force required to pull a steel hook made from a 1/4 inch diameter rod through the specimen. Cut resistance was determined by measuring the force required to pull a thin V-shaped steel plate through the specimen. Tear resistance was determined in a tensile test apparatus by measuring the force required to rip a test specimen.

The above tests show that while the integrated laminate had a slightly lower tensile strength than the multi-wall construction, its snag resistance was over four times that of the multi-wall construction; its cut resistance was over three times that of the multi-wall construction; and its tear resistance was over eight times that of the multi-wall construction. Since one of the major limitations on the use of paper or plastic nettings and laminates in industrial applications has been their low resistance to tearing, it is evident that the integrated netting and lamintae, according to the present invention, is a very substantial improvement over products heretofore available at comparable cost.

FIG. 9 shows, in schematic form, a process for producing a 3-ply integrated netting according to the present invention. A sheet of first warp strand stock 100, which may be a single sheet or a multiple-ply skip-bonded sheet and which is coated with a plastic material on one side is withdrawn from a roll of warp strand stock 102 and directed through a slitting device 104. The warp strand stock preferably is a low-cost heavy basis weight paper but may also comprise plastic sheet stock and may be of any desired width. For example a 1 foot wide roll of warp stock will yield 96 strands, each 1/8 inch wide which, if spaced on 3/4 inch centers, will result in a netting 6 feet wide. The slitting device 104 preferably comprises a group of circular shears extending across the entire width of the warp stock, although other types of slitting equipment may be used, if desired. A special type of circular shear, as shown in FIG. 31, will be described hereinafter in connection with a machine for producing an integrated netting having two sets of weft strands and up to three sets of warp strands. As shown in FIGS. 9 and 9A, after leaving the warp slitter 104, the slit warp strands are directed through a warp strand separator 106, which may comprise two series of spaced pins 108, 110 located on a base 112 and spaced so as to separate the first set of warp strands to the desired spacing.

The first set of warp strands is then carried over the integrating drum 114 which has a resilient surface. Adjacent the top of the integrating drum 114 is an intermittent shear 118 adapted to shear weft strands 120 of the desired width from a single or multiple-ply sheet of weft strand stock 122 fed to the shear 118 by a drive roller 124. The shearing operation is coordinated with the speed of the integrating drum 114 so that the weft strands 120 are spaced on the integrating drum 114 as desired.

A second set of warp strands 126 is then introduced so as to overlay the first set of warp strands and intersect the weft strands 120. The second set of warp strands 126 is slit by a slitting device 128 similar to the previously described slitting device 104 from a sheet of warp strand stock 130, which may preferably be an uncoated low-cost heavyweight basis paper, withdrawn from a roll of warp stock 132 and spaced by a warp strand separator 134 similar to the previously described warp strand separator 106. The assembly of warp and weft strands comprising two sets of warp strands and one set of weft strands is then passed through a heat and compression stage 136 which comprises a heated drum 138 and a rubber compression roller 140. During the compression stage, the first and second sets of warp strands are bonded together in the areas intermediate the locations of the weft strands, but no bonding occurs at the intersection of the warp and weft strands since insufficient heat is transferred at the location of the weft strands to soften the coating on the first warp strands and cause bonding between the first warp strands and the weft strands. After leaving the compression stage 136, the finished 3-ply netting 142 is rolled up on a takeup reel 144.

It is well known that the tensile strength of paper is greater in the machine direction of the paper than in the cross machine direction due to the nature of the papermaking process. To achieve maximum strength for the netting produced by the process of the present invention when formed from paper strands, it is desirable to provide weft strands sheared in the machine direction of the paper stock. This may be accomplished by first shearing the weft paper stock into sheets having a length equal to the width of the integrated paper fabric being formed and then feeding the sheared sheet of weft paper into the intermittent shear 118 so that the weft strands 120 are sheared along the machine direction of the weft paper stock. Weft stock sheets may be spliced together to achieve a continuous supply of material passing under the shear 118. If roll feeding of the weft paper stock is desired, good utilization of the machine direction tensile strength of the weft paper can be achieved by roll-feeding the weft paper stock into the intermittent shear 118 so that the edges of the weft stock 122 intersect the plane of the shear blade at an angle of 30 degrees or less whereby the weft strands 120 lie more nearly along the machine direction of the weft paper. Of course, in this event, a narrow roll of weft stock may be employed, but the drive roller 124 must be skewed so that its axis is parallel to the axis of the roll of weft stock.

A modified method for performing the shearing, integrating the compressing steps required in the preparation of a 3-ply integrated netting, according to the present invention, is shown diagrammatically in FIG. 10. This method is particularly adapted for the production of the light-weight netting materials. As shown in FIG. 10, a first set of spaced coated warp strands 200 is delivered to an integrating drum 202 having a soft resilient covering 204 comprising, for example, sponge rubber. The warp strands 200 are prepared preferably by slitting a roll of heavy basis weight paper and then separating the strands in the manner previously described.

The weft strand shearing and integrating mechanism comprises a pair of I beam sections 206, 208 positioned so that the flanges of the I beam are in parallel spaced relation to each other. A plate 210 provided with a small cavity 212 is fastened to the flange of I beam 206 by a series of cap screws 214. A similar plate 216 provided with a small cavity 218 is fastened to the flange of the I beam 208 by a series of cap screws 220. The cavity 212 is vented through plate 210 and the flange of I beam 206 by passageway 213 and cavity 218 is vented through plate 216 and the flange of I beam 208 by a passageway 219. The thickness of the plates 210 and 216 and the spacing of the I beams 206 and 208 are adjusted so as to define a narrow passageway 222 through which a strip of weft stock 224 may be passed.

A series of rocker arm assemblies 226 are connected to the web of I beam 206 by pivot pins 228 and spaced along the I beam 206, for example, at intervals of 3 to 6 inches. The shearing blade 230 is adjustably fastened to the end of the rocker arm assembly 226 opposite the pivot pin 228, the adjustment being provided by a series of set screws 232 and lock nuts 234. The shearing blade 230 is guided by the edge of plate 210 and is arranged to move either perpendicularly to the plane of the surface of the plate 210 or, as shown in FIG. 10, at an angle, for example, 75 degrees to the plane of the surface of the plate 210. The shearing blade 230 is held firmly against the edge of the plate 210 by rubber pads 236 disposed between the shearing blade 230 and the tip of the rocker arm assembly 226. The rocker arm assembly 226 is required to oscillate only to a very limited angle in order to shear strands from the strip of weft stock 224 and this oscillation is provided by a series of cams 238 which drive the rocker arm assembly 226 toward the weft strip 224 and at the same time compress a resilient bumper 240 located on a stop assembly 242. Expansion of the resilient bumper 240 returns the rocker arm assembly 226 to its original position against a fixed stop 244 connected to the stop assembly 242.

The shearing blade 230 acts against the surface of a replaceable tough resilient cutting block 246, preferably made of nylon, which lies in a groove formed along one edge of the plate 216. The cutting block 246 is held in place in the plate 216 by a series of screws 248. Beyond the cutting block 246 is a stationary guide plate or facing 250, which is also fastened to the plate 216 and contoured to the shape of the covering 204 of the integrating drum 202.

In operation, a first set of warp strands is carried by the coverting 204 of the integrating drum 202 and weft stock 224 is passed through the passageway 222. The rocker arm assembly 226 is then actuated by the cam 238 so as to shear a strand of weft material 252. During the shearing operation the motion of the weft strip 224 causes the strip to buckle into the cavity 218 of plate 216 or into the cavity 212 of plate 210. Upon retraction of the shearing blade 230, the weft strip 224 snaps past the tip of the shearing blade 230 and thereby is positioned for the next shearing action. The speed of rotation of the integrating drum 202, the feed rate of the weft strip 224 and the period of the rocker arm oscillation may be coordinated to produce the desired width of the weft strands 252 and the spacing of each strand along the warp strands 200. It may be seen with reference to FIG. 10 that the weft strands 252 are held in position against the warp strands 200 by the stationary guide plate 250 during passage of the warp and weft strands through the shearing and integrating mechanism.

A second set of warp strands 254 are then positioned so as to overlay the first set of warp strands 200 and intersect the weft strands 252. Warp strands 254 may be slit from a roll of warp stock and separated as previously described. The warp strands 200 and 254 and the weft strands 252 are assembled and bonded in a compression zone defined by the nip between heated roller 256 and the resilient covering 204 of the integrating drum 202. After passing through the compression zone, the finished netting 258 may be rolled upon a takeup reel (not shown).

FIG. 11 illustrates, schematically, a modification of the process shown in FIG. 9 by which the product shown in FIGS. 5 and 6 may be produced. A sheet of first warp stock 300 which may be a single sheet or a multiple-ply skip-bonded sheet is withdrawn from a roll of warp stock 302 and directed through a slitting device 304. The warp stock is preferably a low-cost heavy basis weight paper but may also comprise plastic material and may be of any desired width. The slitting device 304 preferably comprises a group of circular shears as heretofore described. After leaving the warp slitter 304, the slit warp strands are directed through a warp strand separator 306 which may comprise two series of spaced pins 308, 310 located on a base 312 and spaced so as to separate the first set of warp strands to the desired spacing.

The first set of warp strands is then carried over a soft rubber integrating drum 314. Adjacent the top of the integrating drum 314 is an intermittent shear 318 adapted to shear weft strands 320 of the desired width from a sheet of weft stock 322. The shearing operation is coordinated with the speed of the integrating drum 314 and drive roller 316 so that the weft strands 320 are of the desired width and spaced as desired on the integrating drum 314.

A second set of warp strands 326 is then introduced so as to overlay the first set of warp strands and intersect the weft strands 320 after passing around idler roll 329. The second set of warp strands 326 is slit by a slitting device 328 similar to the previously described slitting device 304 from a sheet of warp stock 330 which may preferably be an uncoated low-cost heavy basis weight paper withdrawn from a roll of warp stock 332 and spaced by a warp strand separator 334 similar to the previously described warp strand separator 306.

A first sheet of coated paper 336 which may preferably be a sheet of extensible kraft paper coated with asphalt is withdrawn from a roll of paper 338 and located so that the coated side of the paper 336 is adjacent the first set of warp strands. As the coated paper 336 is withdrawn from the roll of paper 338 a release sheet 337 is stripped off. A second sheet of paper 340 which may preferably be a sheet of extensible kraft paper is withdrawn from a roll of paper 342.

The assembly 344 comprising the paper sheets 336 and 340, the first and second sets of warp strands and the weft strands 320 is then passed through a heating zone 319 which softens the asphalt on sheet 336 and heats sheets 340. The material then passes between one or more compression rollers 348 and backup drum 346. Within the compression stage the sheets 336 and 340 are bonded together with the warp and weft strands entrapped between the sheets 336 and 340 so as to form a tough reinforced laminate. The completed laminate is then rolled up on a takeup reel (not shown).

Several modifications of the process shown schematically in FIG. 11 may be made depending on the specific requirements of the product to be formed thereby.

In the event that it is desired to produce a product having only one set of weft strands and one set of warp strands, the warp strands 326 may be omitted and the sheet 340 passed around idler roll 329. It is also apparent that the sheet material 336 and 340 may comprise a plastic film or paper coated with any suitable plastic or hot melt laminating material. Moreover, the same material need not be laminated to both sides of the paper netting. For example, in FIG. 6, a laminated material is shown having paper on one side and a plastic film on the other side. Of course, if it is desired to have a coated surface on the outside of the laminate, the outside surfaces of the sheets 336 and/or 340 may be coated or the laminate may be given an additional coating subsequent to the compression stage by roll-coating or other conventional methods. If it is desired to use an uncoated kraft paper for the sheets 336 and 340 of the lamination, the laminating material may comprise strips of plastic introduced parallel to intermediate the warp strands 326 and adjacent either sheet 336 or sheet 340. Similarly, lines of hot melt adhesive may be extruded on to either sheet 336 or 340 at positions parallel to and intermediate the warp strands 326.

The integrated netting product shown in FIGS. 12 through 22 is distinguished from that shown in FIGS. 1 through 6, principally in that the product of FIGS. 12 through 22 comprises two sets of weft strands and two or three sets of warp strands. It will be apparent from examination of FIGS. 9, 10 and 11 that the equipment and methods there shown are primarily directed to the manufacture of a product having a single set of weft strands.

In order, efficiently, to manufacture a netting having two sets of weft strands, the equipment shown in FIGS. 23 through 47 has been developed. FIG. 23 is a top plan view of this equipment. For convenience of reference, the horizontal direction as shown in FIG. 23 will be referred to as the machine direction while the vertical direction as shown in FIG. 23 will be referred to as the cross machine direction. The strands running in the machine direction will be referred to as the warp strands while the weft strands run in the cross machine direction. Before describing each part of the machine in detail, it may be well to describe briefly the over-all operation of the machine.

Referring to FIG. 23, warp sheet material is introduced into the machine from feed rolls shown generally at 401. The warp material then passes through a slitter indicated at 402. From the slitter the warp strands pass through an accumulator indicated generally at 403. Weft strands, after having been slit in a slitter similar to that indicated at 402, are passed through an accumulator 406. Emerging from the accumulator, one set of the weft strands passes through a spot gluing mechanism 407 and then both sets of weft strands approach the warp strands at an angle of about 90 degrees. A movable carriage mechanism 408 engages with the two sets of weft strands and carries one of the sets of weft strands over the warp strands while the second set of weft strands is carried beneath the warp strands. After the weft strands are carried across the warp strands, the weft strands are cut by a cutter 409 and the assemblage of warp and weft strands (which may include a second and third set of warp strands positioned at the outside of the assemblage) are then drawn into a platen press 404 where under the influence of pressure and heat (if desired) the warp and weft strands are adhered together. The finished integrated netting is drawn from the platen press 404 by a warp advance mechanism 405. The integrated netting may then be rolled up on an appropriate reel or cut into sheets and stacked.

FIG. 24 illustrates on a larger scale the paper feed mechanism and slitter indicated generally at 401 on FIG. 23. It will be understood that the mechanism of FIG. 24 may be used as a feed for the warp strands and a similar mechanism may be used as a feed for the weft strands, though this is not shown in FIG. 23. In FIG. 24, the several rolls of warp stock are shown at 410. The rolls 410 are mounted on shafts 411 which are, in turn, journaled for rotational movement on the stationary frame 412. It will be appreciated that each roll of warp stock becomes a single ply in a set of warp strands. Thus, if a single-ply strand is desired, only a single roll 410 need be used. On the other hand, if a multiple-ply strand is desired a number of supply rolls 410 will be used.

Stock from the supply roll 410 passes over the guide idler 413 and around a resilient roll 414 past a random gluing mechanism 415 which will be described hereinafter. After passing around the resilient roll 414, the warp stock moves along the entry table 416 and through the slitter 417. The random gluing mechanisms 415 and the slitter 417 are driven through a series of drive chains 418 from a source of power (not shown).

The random gluing mechanisms 415 are shown in more detail in FIGS. 25 and 26. The drive chains 418 for the random gluing mechanisms engage a pair of drive sprockets 419 which are keyed to a stub drive shaft 420 journaled for rotational movement in bearings 422 affixed to one of the end walls 423 of the random gluing device. A stub shaft 424 axially aligned with stub drive shaft 420 is journaled for rotational movement in a bearing 425 affixed to the opposite end wall 426 of the random gluing device 415. The body of the random gluing device comprises a tank made up of the end walls 423 and 426, side walls 428 and 429 and bottom 427. The end walls, side walls and bottom are joined together to form a liquid-tight tank adapted to contain a quantity of adhesive 430. The stub drive shaft 420 and the stub shaft 424 are connected by an eccentric shaft 431 which is welded to the shafts 420 and 424 so that the axis of shaft 431 is parallel to but displaced from the common axis of shafts 420 and 424. Collars 432 are positioned for free movement on shaft 431. The collars 432 have a longitudinal slot adapted to receive the lower edge of a plate 433 which may be affixed as by welding to the collars 432. At least one pair of guide pins 434 are affixed opposite each other in the side walls 428 and 429 to limit the lateral movement of the plate 433. The operation of the random gluing device 415 can best be explained by reference to FIGS. 27, 28 and 29 which show, in schematic form, several consecutive positions of the plate 433 relative to the paper passing around the resilient roll 414. In FIG. 26, plate 433 is shown in its lowest position below the level of adhesive in the tank of the random gluing device 415. As the sprockets 419 are rotated in a clockwise direction, the top of plate 433 is driven to the right and upwards as shown in FIG. 27. As the sprockets 419 are rotated further in a clockwise direction, the collars 432 move further upward and the top of the plate 433 is driven upward and to the left as shown in FIG. 28. In its uppermost position the top of the plate 433 clears the surface of the liquid adhesive in the random gluing device 415 and engages with the sheet stock passing around the resilient roll 414. At the time when the top of the plate 433 engages with the paper, the top of the plate is moving at approximately the same velocity as the sheet stock and hence deposits a line of adhesive on the stock. As shown in FIG. 29, continued rotation of the drive sprocket 419 causes the plate 433 to be driven downward out of engagement with the stock passing around the resilient roll 414. It will be appreciated that for each rotation of the drive sprocket 419 the plate 433 will dip below the surface of adhesive in the random gluing device and rise up against the moving strip material so as to apply a line of adhesive laterally along the surface of the moving strip material. The speed of rotation of the drive sprocket 419 may be adjusted relative to the velocity of the stock withdrawn from the supply rolls 410 so that the lines of adhesive applied by the random gluing device may be spaced as desired. FIG. 30 illustrates, schematically, a laminate of 4 plies of stock 435 adhered together by lines of adhesive 436.

After leaving the random gluing stations 415 and passing around the resilient rolls 414, the laminate of sheets moves along the entry table 416 and approaches the slitter 417. Referring to FIG. 24, the slitter 417 is preferably of the rotary disc type and comprises a driven lower shaft 437 which, in turn, drives an upper shaft 438, both shafts being journaled for rotational movement in an adjustable frame 439. A series of cutting dics 440 is affixed to the lower shaft 437 and a similar set of discs 441 is affixed to the upper shaft 438. The laminated strand stock material is guided through the slitter 417 by a set of lower guide vanes 442 and upper guide vanes 443. As is best shown in FIG. 31, the upper and lower discs 441 and 440, respectively, are overlapping. In the particular design shown in FIG. 31, the positions of the upper and lower discs alternate so that there is no tendency for the cut strands to twist in a lateral direction, but instead the cut strands will tend to lie flat against the guide vanes 442 and 443.

The strands 444 cut in the slitter 417 are next spaced and directed into an accumulator 403, a preferred form of which is shown in FIGS. 32 and 33. The accumulator 403 comprises a stationary frame 445 on which rollers 446, 447, 449 and 450 are journaled for free rotation. A series of pulleys 451 are mounted for free rotation at the top of the frame 445. Roller 448 is mounted for free rotation within a guide frame 454, which in turn is adapted to slide in a vertical direction in the frame 445. Cables 453 are attached, at one end to the guide frame 454 and passed over the pulleys 451. The other ends of the cables 453 are connected to a counter-weight 452. The accumulator permits the random gluing devices and the slitting device to operate at a constant speed while at the same time permitting strands 444 to be withdrawn from the accumulator intermittently or, within limits, at a variable rate.

It will be appreciated that while the strand stock feed and random gluing device, the slitter, and the accumulator have been described in connection with the warp strand portion of the machine shown in FIG. 23, similar equipment may be employed for the weft strand feeding portion of the machine.

If it is desired to manufacture an integrated netting having one set of warp strands and one set of weft strands, then all the paper strands from the accumulator are withdrawn from the roll 450 and passed as a unit through the warp and weft strand assembling portion of the machine. If the integrated netting to be manufactured comprises two sets of warp strands and two sets of weft strands, as is the usual case, then half of the strands coming from the accumulator are withdrawn from the roller 449 while the alternate strands are withdrawn from the roller 450.

Referring now to FIG. 34, the warp and weft strand assembly device 455 is shown at the left of the figure while the platen press 404 appears in the center and the warp strand advance mechanism 405 is shown at the right. A side view of the warp and weft strand assembly mechanism appears in FIG. 36.

The warp and weft strand assembly mechanism comprises a pair of upright frame members 456 at one end of the mechanism and a pair of upright support members 457 at the opposite end of the mechanism. Horizontal bed members 458 are carried by the frame and support members 456 and 457. A pair of horizontal rail members 459 are carried on one end by the vertical support members 456 and at the other end by the platen press 404. As best shown in FIGS. 36 and 41, a pair of double rail members 460 is carried by the platen press 404. The rail members 460 are parallel to but horizontally spaced from the rail members 459. A second pair of double rail members 461 adapted to communicate with the rail members 460 is mounted on the bifurcated movable carriage member 462 which, in turn, is adapted to slide on the bed members 458. The bifurcated carriage member 462 is driven along the bed members 458 by the action of the hydraulic cylinder 463 which may be actuated by an appropriate switch and pump (not shown).

The support plate 464 is carried by the rails 459 and is best shown in FIGS. 42 and 43. The support plate 464 has two apertures 465 through which the sets of weft strands may be drawn. A reciprocating straight edge or serrated knife 466 is positioned between the apertures 465 so that it lies between the sets of upper and lower weft strands which will be drawn past the knife. The knife 466 is driven by an appropriate motor unit 467.

Referring now to FIG. 37, in particular, an upper carriage clamp bushing block 468 lies on the upper horizontal double rail member 461 and carries an upper clamp jaw 470. A movable upper clamping jaw 472 controlled by upper jaw actuators 474, which may be of the pneumatic or electromagnetic type, is adapted to engage the upper clamp jaw 470 so as to hold firmly the upper set of weft strands 477. In like manner, a lower carriage clamp bushing block 469 retains open type ball bushings and slides on the lower horizontal double rail member 461 and carries a lower clamp jaw 471. A lower clamping jaw 473, controlled by lower jaw actuators 475, is adapted to engage with the lower clamp jaw 471. A clamp linking frame 476 (FIG. 36) is connected at one end to support plate 464 and engages with the upper and lower carriage clamp jaws 470 and 471, so that, when desired, the support plate and the upper and lower carriage clamps may be moved as a unit toward the platen press 404 or back into position to receive a new group of weft strands.

Referring now to FIGS. 37, 42 and 43, the weft strand creel clamp assembly carried by the support plate 464 will be described. The weft strand creel clamp assembly comprises an upper clamp member 479 slideably connected to the support plate 464 and a lower clamp member 480, also slideably connected to the support plate 464. The upper clamp member 479 is controlled by an upper clamp actuator 481 (FIG. 42) mounted on the support plate 464 while the lower clamp member 480 is controlled by a lower clamp actuator 482 mounted on the support plate 464. The actuators 481 and 482 may be of the pneumatic or electromagnetic type as desired. FIG. 37 shows the upper and lower clamp members 479 and 480 in their open position while FIG. 38 illustrates the closed position of the upper and lower clamp members. The jaws of the upper and lower clamp members 479 and 480 are preferably covered with rubber or some other relatively soft resilient material.

As best shown in FIGS. 36, 37 and 38, the weft strand creel clamp assembly is positioned on the weft strand supply side of the upper and lower clamp members 479 and 480. This device comprises a slideable clamp ram 483 controlled by a pneumatic or electromagnetic actuator 486. The slideable ram 483 is positioned horizontally between the upper creel clamp jaw **484*a* and the lower creel clamp jaw 484*b*. Rubber or other resilient material is mounted on stationary clamping bar 485 where it contacts the upper and lower creel clamp jaws 484*a* and 484*b*. In FIG. 37 the creel clamp assembly is shown in gripping position against the weft strands 477 and 478**, while in FIG. 38 the creel clamp assembly is shown in its free position.

The operation of the carriage mechanism will now be described with reference to FIGS. 36 through 40. As shown in FIG. 37, one set of warp strands 444 has been threaded through the machine and the carriage 462 is in its leftmost position. On the right hand side of the machine, the clamping members 479 and 480 are open, the creel clamp jaws **484*a* and 484*b* are in gripping position and the ends of weft strands 477 and 478 protrude from the creel clamp jaws. The bifurcated carriage member 462 is then moved to the right by the action of the hydraulic cylinder 463 until the upper and lower carriage clamp jaws 470 and 471 pass the knife 466 and overlap the stub ends of the weft strands 477 and 478. The carriage clamp jaws are then closed by energizing the actuators 474 and 475 to bring the upper and lower clamping jaws 472 and 473 into engagement with the weft strands 477 and 478 as is best shown in FIG. 40. The bifurcated carriage member 462 is then returned to its leftmost position, withdrawing with it the upper and lower sets of weft strands 477 and 478 as is best shown in FIG. 38. During this operation, of course, the upper and lower creel clamp jaws 484***a* and 484*b* are released so that the weft strands can be drawn through the jaws. When the bifurcated carriage member 462 has reached its extreme left position, the upper and lower creel clamp jaws 484*a* and 484*b* are returned to gripping position and the upper and lower clamping members 479 and 480 are moved to the closed position due to the influence of clamp actuators 481 and 482 as best shown in FIG. 38. When the upper and lower clamp members 479 and 480 are brought into the closed position they firmly engage the sets of weft strands 477, 478 against the knife support and the knife 466. The knife 466 may then be reciprocated under the action of the motor drive unit 467 to cut both the upper and lower weft strands 477 and 478 as is best shown in FIG. 39.

It will be appreciated that in the assembly section of the machine there now exists a set of warp strands 444 sandwiched between two sets of weft strands 477 and 478. The weft strands 477 and 478 having been cut, the assemblage of warp and weft strands may now be moved in the machine direction toward the platen press. Referring to FIG. 23, it will be noted that due to the necessary separation between the platen press 404 and the warp and weft assembly section of the machine, it is necessary to move the sets of weft strands 477 and 478 relative to the warp strands 444 until the most recently positioned sets of weft strands are adjacent the previously positioned set of weft strands. When this initial movement has been completed, the warp and weft strands can then be moved as a unit into the platen press 404. Such movement is accomplished through a support plate drive cable 488, fastened to the support plate 464 and passed over a pulley 489 which may, for convenience, be mounted on the warp advance mechanism 405. The cable 488 is connected to the movable piston of an hydraulic cylinder means 490 which may be conveniently fastened to the upright frame members 456. The movable portion of the hydraulic cylinder mechanism 490 contains a rack 491 adapted to mesh with the drive gear 492. The gear 492 is connected through clutch means 493 to the lower drive roll 495 on the warp advance mechanism 405 which engages the completed integrated netting which has passed through the platen press 404. Upon actuation of the hydraulic cylinder means 490, the support plate 464, and the upper and lower carriage clamp assemblies with the assemblage of weft strands 477 and 478 are moved toward the platen press, but the warp strands 444 remain stationary since the clutch 493 for the warp strand advance mechanism 405 remains disengaged. After the assemblage of weft strands has been properly positioned relative to the previous set of weft strands, a cam surface on the support plate 464 strikes a microswitch 500 (FIG. 42) which actuates the clutch 493 on the warp strand advance mechanism 405. The warp strands 444 are then drawn through the warp strand advance mechanism 405 so that the assemblage of warp strands 444 and weft strands 477 and 478 move together into the platen press 404 and the completed netting is withdrawn from the press. After the support plate 464 has been moved to its extreme right position as shown in FIG. 34, and after the platen press has closed, the upper and lower clamping members 479 and 480 are released, the upper and lower carriage clamp jaws 472 and 473 are released and the movable portion of the hydraulic cylinder 490 is returned to its original position. The drive cable 488 is a continuous loop passing around loose pulleys 496 and 497 and terminating at the supporting plate 464. Thus, the drive cable 488 is able, positively, to drive the support plate 464 in either forward or reverse direction. The support plate 464 and its associated mechanism having been returned to the original operating position, another cycle of the creel mechanism 408 may be instituted whereby another group of weft strands 477 and 478 will be assembled with the warp strands 444.

As described up to the present point, the assemblage of warp and weft strands comprises two sets of weft strands 477 and 478 and one set of warp strands 444. If it is desired to produce an integrated netting having two sets of warp strands as well as two sets of weft strands, the second set of warp strands 487 may be introduced to the assemblage of warp and weft strands just prior to admission of the assemblage into the platen press 404. As noted previously, a portion of the strand from the accumulator (FIG. 32) may be withdrawn from the accumulator roll 449 and carried beneath the warp and weft strand assembly device 455 (FIG. 34) and through a spot gluing mechanism 501 which will be described in detail hereafter. This set of warp strands 487 then passes over a lower warp strand guide 498 (FIG. 42) adjacent the opening of the platen press 404 where it joins the assemblage of warp and weft strands heretofore referred to.

The platen press, being of conventional design, need not be described here.

FIG. 44 shows in schematic form the passage of the integrated netting through the platen press 404 and through the warp strand advance mechanism 405. From this figure it is readily apparent that the sets of weft strands 477 and 478 sandwich the warp strands 444 and that the lower set of warp strands 487 are added to the assemblage just prior to entry of the assemblage into the platen press 404. The finished integrated netting is drawn from the press by means of the drive rolls 494 and 495 which form part of the warp strand advance mechanism 405. The rolls 494 and 495 may have a soft resilient surface in order better to grip the finished integrated netting.

FIG. 45 shows an end view of the machine for producing the integrated netting looking directly at the warp strand advance mechanism 405. In FIG. 45 it may be noted that the drive from the rack 491 to the gear 492 passes through a clutch 493 before driving the lower roll 495. It is desirable also to provide a brake 502 for the lower roll 495 in order that its motion may be precisely and positively controlled.

FIGS. 46 and 47 show in more detail the spot gluing apparatus which is used to provide spots of glue on one surface of the warp strands 487 in order that they may be adhered to the warp strands 444 during passage through the platen press 404. A similar spot gluing device is used for applying spots of adhesive to the set of weft strands 477 in order that they may be adhered to the set of weft strands 478. Such a device is shown in FIG. 36 at 502. The spot gluing device shown in FIGS. 46 and 47 comprises a semi-cylindrical body portion 503 to which are affixed end plates 504 and 505. A drum 506 is mounted for rotation on shaft 507 carried by bearings (not shown) within the body of the device. Blunt-ended pins 508 are mounted on the rotatable drum 506 in a series of rows spaced along the length of the drum to correspond to the spacing of the strands of warp or weft material intended to be passed through the spot gluing device. Above the rotatable drum 506 is an arm 509 pivoted from a fixed shaft 510 and controlled for oscillatory motion by an actuator 511 which may be either of the electromagnetic or pneumatic type. A roller 512 having a resilient surface is mounted for free rotation on the arm 509. The axis of the roller 512 is parallel to the axis of the rotatable drum 506. An idler roller 513 is positioned above the drum 506 and along one edge of the spot gluing device 501. Adjacent the idler roller 513 is a strand separator 514 which is adapted to space warp strands 487 along the roller 512 so as to align the warp strands with the rows of blunt-ended pins mounted in the rotatable drum 506. In operation, the warp strands 487 move around the body portion 503 of the spot gluing device, around the idler roller 513, through the strand spacer 514 and around the resilient roller 512. At timed intervals, corresponding to the movement of the warp strands 444 and 487, the actuator 511 causes the arm 509 to oscillate downwards toward the drum 506 and by so doing the strand 487 engages momentarily one of the blunt-ended pins 508 and a drop of adhesive carried by the end of the pin is applied to the strand. As shown in FIG. 35 and FIG. 46 the spot gluing device is driven by a drive cable 514' which is attached at one end to the support plate 464 and at the other end to the movable rack 491. It will thus be apparent that the drive for the spot gluing mechanism is synchronized with the motion of the integrated netting as it passes through the machine.

Referring now to FIG. 36, a spot gluing device is shown at 502 for adhering weft strand 478 to weft strand 477. The spot gluing device 502 is driven by a drive cable 515, fastened to an arm 516 which is fixed to the upper carriage member 462 and moves with it. The cable then passes around a free pulley 517 and around second and third free pulleys 518 and 519. Thus, the rotation of the spot gluer 502 will be controlled by the motion of the arm 516 and synchronized with the motion of the weft strand 477.

If it is desired to manufacture an integrated netting such as that shown in FIGS. 18 through 22 which comprises three sets of warp strands 91, 92 and 93 and two sets of weft strands 94 and 95, it will be apparent that it will be necessary to add a third set of warp strands at the top of the machine. The third set of warp strands may be introduced directly into the platen press 404 on the opposite side of the warp strands 444 at a point corresponding to the point of introduction of the second set of warp strands 487.

The integrated netting, according to the present invention, and as manufactured by the machine illustrated in FIGS. 23 through 47, needs no backing or other additions to maintain its integrity. However, there may be occasions when it is desired to apply a sheet of paper or a sheet of plastic to one or both sides of the integrated netting in order to render the material waterproof or vaportight. Such material may be added in a separate and additional process step using the finished integrated netting from the present machine as the starting material.

The terms and expressions which have been employed herein are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. An integrated netting comprising a first set of spaced parallel flat warp strands made from paper, a set of spaced parallel flat weft strands made from paper and disposed substantially perpendicular to the first set of warp strands and a second set of spaced parallel flat paper warp strands, each of the strands of said second set of warp strands overlying a respective one of the strands of said first set of warp strands and sandwiching said set of weft strands between said first and second sets of warp strands, said first and second sets of warp strands being bonded together intermediate the intersections of the said weft strands and the said first and second sets of warp strands.

2. The product as set forth in claim 1 in which the weft strands are formed from multiple piles of flat paper strips, the individual plies of paper being bonded together at discrete locations between adjacent plies to form flexible multiple-ply strands.

3. The product as set forth in claim 1 in which the weft strands and the first and second sets of warp strands are formed from multiple plies of flat paper strips, the individual plies of paper being bonded together at discrete locations between adjacent plies to form flexible multiple-ply strands.

4. An integrated paper netting as set forth in claim 1, wherein a sheet of flexible material is disposed adjacent to one of the said sets of paper warp strands, said sheet of flexible material being adhered to said set of warp strands.

5. An integrated laminate comprising a set of spaced parallel flat warp strands made from paper, a set of spaced parallel flat weft strands made from paper and disposed substantially perpendicular to the set of warp strands, and first and second sheets of flexible material, each disposed adjacent a respective one of said sets of spaced parallel strands, said first and second flexible sheets being adhered together in the interstices of the sets of warp and weft strands.

References Cited

UNITED STATES PATENTS

| | | | |
|---|---|---|---|
| 3,069,746 | 12/1962 | Scharf | 161—91X |
| 3,138,514 | 6/1964 | Florio | 161—148X |
| 3,479,244 | 11/1969 | Burnett | 161—58 |
| 1,285,465 | 11/1918 | Tewksbury | 161—89 |
| 1,347,761 | 7/1920 | Shay | 161—89X |
| 2,593,553 | 4/1952 | Francis, Jr. | 161—89X |
| 2,713,551 | 7/1955 | Kennedy | 161—57X |
| 3,214,320 | 10/1965 | Lappala et al. | 161—89 |

FOREIGN PATENTS

| | | | |
|---|---|---|---|
| 98,395 | 7/1961 | Norway | 161—55 |
| 870,798 | 6/1961 | Great Britain | 161—71 |

ROBERT F. BURNETT, Primary Examiner

R. L. MAY, Assistant Examiner

U.S. Cl. X.R.

156—181, 441; 161—60, 115, 120, 148